US008561205B2

(12) United States Patent
McCurdy et al.

(10) Patent No.: US 8,561,205 B2
(45) Date of Patent: *Oct. 15, 2013

(54) SYSTEMS AND METHODS FOR DISTRIBUTING AND VIEWING ELECTRONIC DOCUMENTS

(75) Inventors: Kevin McCurdy, San Francisco, CA (US); Samuel Hong-Yen Pai, San Francisco, CA (US); John Kelleher, Burlingame, CA (US); Richard Maggiotto, San Francisco, CA (US)

(73) Assignee: Zinio, LLC, San Francisco, CA (US)

( * ) Notice: Subject to any disclaimer, the term of this patent is extended or adjusted under 35 U.S.C. 154(b) by 1449 days.

This patent is subject to a terminal disclaimer.

(21) Appl. No.: 11/901,959

(22) Filed: Sep. 18, 2007

(65) Prior Publication Data

US 2008/0082903 A1    Apr. 3, 2008

Related U.S. Application Data

(63) Continuation of application No. 09/897,190, filed on Jul. 2, 2001, now Pat. No. 7,290,285.

(60) Provisional application No. 60/215,683, filed on Jun. 30, 2000.

(51) Int. Cl.
    *H04L 29/06*    (2006.01)
(52) U.S. Cl.
    USPC .............................. 726/27; 713/153; 713/155
(58) Field of Classification Search
    USPC ........... 726/26–33; 380/200–201, 51; 705/42, 705/38, 37; 713/150, 153, 155
    See application file for complete search history.

(56) References Cited

U.S. PATENT DOCUMENTS

| 4,159,417 A | 6/1979 | Rubincam |
| 4,431,865 A | 2/1984 | Bernede et al. |

(Continued)

FOREIGN PATENT DOCUMENTS

WO    00/23904    4/2000

OTHER PUBLICATIONS

Executive Summary—Network, Screen and Page: The Future of Reading in a Digital Age, prepared by INTERQUEST and the University of Virginia, published by The Electronic Document Systems Foundation, Copyright 1997.

(Continued)

*Primary Examiner* — David Garcia Cervetti
(74) *Attorney, Agent, or Firm* — Thompson Hine L.L.P.

(57) ABSTRACT

The invention relates to systems and methods for distributing and viewing electronic documents. In one embodiment, the invention provides a system for distributing electronic versions of printed documents comprising a memory device and a distribution system. The memory device is in operable communication with a content provider and stores at least one electronic document file that is based at least in part on a source electronic document provided by the content provider, wherein the source electronic document is an electronic version of a printed document. The distribution system is in operable communication with the memory device and is programmed for responding to requests from a client for delivery of an electronic document file, retrieving a copy of the requested electronic document file from the memory device, assigning at least one right to the copy of the electronic document file, the right defining the scope of at least one action capable of being be performed on at least a portion of the copy of the electronic document file, encrypting the copy of the electronic document file with a key based at least in part on the identity of the client and on the at least one right, and providing the copy of the electronic document file, with the associated key, to the client.

31 Claims, 21 Drawing Sheets

(56) References Cited

U.S. PATENT DOCUMENTS

| | | |
|---|---|---|
| 4,972,496 A | 11/1990 | Sklarew |
| 5,109,354 A | 4/1992 | Yamashita et al. |
| 5,220,657 A * | 6/1993 | Bly et al. .................... 711/152 |
| 5,239,665 A | 8/1993 | Tsuchiya |
| 5,339,091 A | 8/1994 | Yamazaki et al. |
| 5,376,945 A | 12/1994 | Takenaka et al. |
| 5,417,575 A | 5/1995 | McTaggart |
| 5,438,344 A | 8/1995 | Oliva |
| 5,467,102 A | 11/1995 | Kuno et al. |
| 5,475,398 A | 12/1995 | Yamazaki et al. |
| 5,475,399 A | 12/1995 | Borsuk |
| 5,485,176 A | 1/1996 | Ohara et al. |
| 5,487,698 A | 1/1996 | Kettlewell et al. |
| 5,534,888 A | 7/1996 | Lebby et al. |
| 5,597,307 A | 1/1997 | Redford et al. |
| 5,624,265 A | 4/1997 | Redford et al. |
| 5,630,103 A | 5/1997 | Smith et al. |
| 5,631,883 A | 5/1997 | Li |
| 5,644,339 A | 7/1997 | Mori et al. |
| 5,663,748 A | 9/1997 | Huffman et al. |
| 5,696,982 A | 12/1997 | Tanigawa et al. |
| 5,697,793 A | 12/1997 | Huffman et al. |
| 5,703,624 A | 12/1997 | van Kruistum |
| 5,710,576 A | 1/1998 | Nishiyama et al. |
| 5,734,981 A | 3/1998 | Kennedy, III et al. |
| 5,749,735 A | 5/1998 | Redford et al. |
| 5,761,485 A | 6/1998 | Munyan |
| 5,761,681 A | 6/1998 | Huffman et al. |
| 5,761,682 A | 6/1998 | Huffman et al. |
| 5,765,152 A | 6/1998 | Erickson |
| 5,774,109 A | 6/1998 | Winsky et al. |
| 5,788,507 A | 8/1998 | Redford et al. |
| 5,801,713 A | 9/1998 | Endo et al. |
| 5,802,516 A | 9/1998 | Shwarts et al. |
| 5,810,604 A | 9/1998 | Kopp, Jr. et al. |
| 5,819,032 A | 10/1998 | de Vries et al. |
| 5,820,379 A | 10/1998 | Hall et al. |
| 5,835,923 A | 11/1998 | Shibata et al. |
| 5,847,698 A | 12/1998 | Reavey et al. |
| 5,850,520 A | 12/1998 | Griebenow et al. |
| 5,893,132 A | 4/1999 | Huffman et al. |
| 5,897,324 A | 4/1999 | Tan |
| 5,909,207 A | 6/1999 | Ho |
| 5,909,690 A | 6/1999 | Tanigawa et al. |
| 5,914,707 A | 6/1999 | Kono |
| 5,926,624 A | 7/1999 | Katz et al. |
| 5,933,841 A | 8/1999 | Schumacher et al. |
| 5,948,056 A * | 9/1999 | Mizuno et al. ................ 709/204 |
| 5,954,515 A | 9/1999 | Iggulden |
| 5,956,017 A | 9/1999 | Ishizawa et al. |
| 5,956,034 A | 9/1999 | Sachs et al. |
| 5,956,048 A | 9/1999 | Gaston |
| 5,957,695 A | 9/1999 | Redford et al. |
| 5,957,697 A | 9/1999 | Iggulden et al. |
| 5,970,231 A | 10/1999 | Crandall |
| 5,978,933 A | 11/1999 | Wyld et al. |
| 5,986,690 A | 11/1999 | Hendricks |
| 5,991,594 A | 11/1999 | Froeber et al. |
| 6,020,863 A | 2/2000 | Taylor |
| 6,037,954 A | 3/2000 | McMahon |
| 6,041,215 A | 3/2000 | Maddrell et al. |
| 6,052,117 A | 4/2000 | Ohara et al. |
| 6,056,076 A | 5/2000 | Bartel et al. |
| 6,064,384 A | 5/2000 | Ho |
| 6,072,476 A | 6/2000 | Harada et al. |
| 6,124,851 A | 9/2000 | Jacobson |
| 6,176,427 B1 | 1/2001 | Antognini et al. |
| 6,282,653 B1 * | 8/2001 | Berstis et al. .................... 726/26 |
| 6,331,865 B1 | 12/2001 | Sachs et al. |
| 6,385,596 B1 * | 5/2002 | Wiser et al. ..................... 705/51 |
| 6,389,541 B1 | 5/2002 | Patterson |
| 6,438,588 B1 | 8/2002 | Crandall |
| 6,473,785 B1 * | 10/2002 | Mizuno et al. ................ 709/205 |
| 6,477,649 B2 * | 11/2002 | Kambayashi et al. ........... 726/27 |
| 6,493,731 B1 * | 12/2002 | Jones et al. .................... 715/234 |
| 6,763,346 B1 * | 7/2004 | Nishida et al. ................ 707/802 |
| 6,772,340 B1 | 8/2004 | Peinado et al. |
| 6,817,535 B2 | 11/2004 | Epstein |
| 6,868,403 B1 * | 3/2005 | Wiser et al. ..................... 705/51 |
| 7,020,781 B1 * | 3/2006 | Saw et al. ........................ 705/51 |
| 7,054,443 B1 * | 5/2006 | Jakubowski et al. ........... 380/28 |
| 7,263,497 B1 * | 8/2007 | Wiser et al. ..................... 705/51 |
| 7,308,413 B1 * | 12/2007 | Tota et al. .................... 705/7.11 |
| 7,657,910 B1 * | 2/2010 | McAulay et al. ............... 725/61 |
| 7,844,835 B2 * | 11/2010 | Ginter et al. .................. 713/193 |
| 7,921,464 B2 * | 4/2011 | Jang ................................ 726/27 |
| 2002/0077985 A1 * | 6/2002 | Kobata et al. .................... 705/51 |
| 2002/0077986 A1 * | 6/2002 | Kobata et al. .................... 705/52 |
| 2002/0114465 A1 * | 8/2002 | Shen-Orr et al. ............. 380/231 |
| 2002/0138362 A1 * | 9/2002 | Kitze et al. ..................... 705/26 |
| 2002/0144283 A1 * | 10/2002 | Headings et al. ............. 725/109 |
| 2003/0018541 A1 * | 1/2003 | Nohr ............................... 705/26 |
| 2003/0105718 A1 | 6/2003 | Hurtado et al. |
| 2004/0210765 A1 | 10/2004 | Erickson |
| 2005/0038753 A1 * | 2/2005 | Yen et al. ....................... 705/59 |
| 2006/0021062 A1 * | 1/2006 | Jang ................................ 726/27 |
| 2006/0136339 A1 * | 6/2006 | Kim et al. ....................... 705/51 |
| 2007/0157318 A1 * | 7/2007 | Lee et al. ........................ 726/27 |
| 2007/0162399 A1 * | 7/2007 | Medvinsky et al. ............ 705/59 |
| 2008/0163377 A1 * | 7/2008 | Lee et al. ........................ 726/26 |

OTHER PUBLICATIONS

Notification of Transmittal of the International Search Report mailed Sep. 28, 2001.

* cited by examiner

SYSTEMS AND METHODS FOR DISTRIBUTING AND VIEWING ELECTRONIC DOCUMENTS

CROSS REFERENCE TO RELATED APPLICATION

This is a Continuation of application Ser. No. 09/897,190, filed Jul. 2, 2001 now U.S. Pat. No. 7,290,285, which claims priority to U.S. Provisional Application No. 60/215,683, filed Jun. 30, 2000, which is hereby incorporated by reference.

FIELD OF THE INVENTION

Embodiments of the invention generally relate to devices, systems, and methods for permitting a user to acquire content and view the content on a viewing device, such as the screen of a computer. More particularly, the invention relates to systems and methods for distributing viewing electronic documents that provide a user with the ability to view pages of a document, such as such as a magazine, in a format that looks the same as the conventional printed version of the document and which permit the user to interact with portions of those pages in ways that may not be possible with the conventional printed version of the document.

BACKGROUND OF THE INVENTION

A huge quantity of printed magazines, newspapers, and books are widely distributed in the traditional paper format. In addition to using lots of paper to manufacture these products, the distribution (i.e., shipping, transportation, and display) of books, magazines and newspapers consumes a lot of resources as well. The readers of many of these publications, such as newspapers and magazines, discard them shortly after the user is done reading them, thus adding to the burden of waste disposal.

With the increased growth and popularity of the Internet, many publishers have been turning to distributing their publications in alternate formats, such as in online format, and/or via media such as compact disk read only memories (CD-ROMS). With this technique, a user can instead read the publication on the screen of his or her personal computer (PC). At the present time, however, despite the availability of such publications, consumers have been slow to accept reading from a computer screen. In response to the lukewarm response by consumers, makers of personal digital assistants (PDA) devices such as the Palm TV (available from Palm, Inc., 5470 Great America Parkway, Santa Clara, Calif.) and of electronic books (E-books) such as the ROCKET EBOOK and/or SOFTBOOK (available from NUVOMEDIA, Inc., 310 Villa Street, Mountain View, Calif.) have attempted to provide devices and systems that attempt to more closely simulate the experience of reading an actual book. These devices are small and lightweight, like most books, magazines, and newspapers, but still do not provide the same experience as reading all of these types of publications. Because the screen size on the PDA's and ROCKET EBOOKS is relatively small, it is difficult to put an entire page of a newspaper or magazine on the screen of either of these devices. In addition, neither device permits the reader to see the entire page exactly as it appears in the conventional published document. Also, these devices have low resolution and use proprietary software and or proprietary Internet-based language requirements.

Another disadvantage of such devices is that publications made available on such devices must be translated and recomposed for their screens and systems. The ROCKET EBOOK, for example, calculates pages for each book depending on the font style, size and page orientation chosen. Because these factors make paging relative, the same book on different ROCKET EBOOK with different settings will have different page numbers. This feature, while acceptable for publications such as novels, is less satisfactory for publications having tables of contents, such as magazines and other periodicals. In addition, the page layout, colors, arrangement, illustrations, and even advertisements, form an integral part of the magazine's enjoyability and the convenience of the reading experience. These devices do not provide this type of experience during use.

One device that attempts to provide the experience of having the same format for reading books is called the EVERYBOOK, manufactured by EVERYBOOK, Inc., 2300 Vartan Way Harrisburg, Pa. The EVERYBOOK devices use existing print files from publishers and display them exactly as they would appear in print. One device offered by this manufacturer, called the EB Journal, offers full-page dual-screens, a color display, and provides storage for up to 200 fully illustrated reference books or 2,000 novels on each secure, removable storage card. To acquire content, users of the EVERYBOOK devices communicate directly with the content provider.

SUMMARY OF THE INVENTION

Although some devices and systems such as the EB Journal might be able to enable users to read books in a format that approximates the way the book looks in print, such devices and systems do not enhance the reader's experience by taking full advantage of the capabilities now offered by wireless and cellular technology or the interactive capabilities inherent in reading a document electronically. In addition, known devices, systems, and methods do not provide users with an experience that replicates some of the most desired aspects of using conventional printed publications, such as tearing out pages, marking and/or "dog-earring" a page, or passing the magazine along to another reader. In addition, most users want to view entire pages at once, with the pages having an appearance, layout, and quality similar to that of the printed paper publication. Many users also want to be able to view opposing pages to a given page at the same time as viewing a given page (as they can with a conventional magazine).

In one aspect, the present invention provides systems and methods for distributing and viewing electronic documents, such as magazines, periodicals, books, etc., which closely simulate the experience of reading the printed counterparts.

The invention relates to systems and methods for distributing and viewing electronic documents. In one embodiment, the invention provides a system for distributing electronic versions of printed documents comprising a memory device and a distribution system. The memory device is in operable communication with a content provider and stores at least one electronic document file that is based at least in part on a source electronic document provided by the content provider, wherein the source electronic document is an electronic version of a printed document.

The distribution system is in operable communication with the memory device and is programmed for responding to requests from a client for delivery of an electronic document file, retrieving a copy of the requested electronic document file from the memory device, assigning at least one right to the copy of the electronic document file, the right defining the scope of at least one action capable of being performed on at least a portion of the copy of the electronic document file, encrypting the copy of the electronic document file with a key based at least in part on the identity of the client and on the at least one right, and providing the copy of the electronic document file, with the associated key, to the client.

Embodiments of the invention can include the following. In one embodiment, the at least one right relates to the scope of at least one action capable of being performed by the client receiving the copy of the electronic document file, such as annotating, copying, printing, forwarding, editing, highlighting, tabbing, storing, and making at least a portion of the electronic document file available to another client. In one embodiment, the electronic document file stored in the memory device includes at least one element that was not present in the source electronic document, such as audio information, video information, textual information, graphic information, and links to locations on a computer network. In one embodiment, the system further comprises a conversion module in operable communication with the memory device, the conversion module transforming the source electronic document into the electronic document file.

In another embodiment, the invention provides a method for viewing electronic documents. A request is sent for an electronic document file to a server, the request associated with a given user. An electronic document file is received, the electronic document file encrypted by a key uniquely associated with the user, wherein the key includes at least one right defining how the user can use the electronic document file. The electronic document file is displayed to the user, and the user is permitted to interact with the electronic document file in accordance with the at least one right.

Additional embodiments include the following. In one embodiment, the step of permitting user interaction with the electronic document file further comprises treating facing pages of document as single page for the purposes performing operations on the page. In one embodiment, information is recorded relating to the user's usage of the electronic document file, such as the user's readership of the file and/or the user's passing along of at least a portion of the file to another client.

In one aspect, at least one embodiment of the invention provides a system that is usable with a device for "reading" the electronic document. In one embodiment, the device for reading is an electronic device such as a general purpose computer. In one embodiment, the device is a portable wireless device such as an electronic book reader device. The systems, methods, and devices of the present invention also enable users to access and acquire content, such as electronic magazines and other periodicals, via a data server in communication with publishers of the document, content providers, or a computer network such as the Internet. In at least one embodiment, the systems and methods of the invention enable users to seamlessly interact with the displayed document, providing features similar to conventional printed documents, such as realistic page turning, page tear-out, page marking, and pass-along to others. In at least one embodiment, the invention provides systems and methods for reading an electronic document that go beyond the capabilities of conventional printed documents, such as interaction with advertisers, embedding links, audio, video, and further information within the document, tracking of readership, and the like.

In another embodiment, the invention provides a system for distributing an electronic version of a printed document, comprising means for storing at least one electronic document file, means for receiving a request for a copy of the electronic document file from a client, means for encrypting a copy of the electronic document file, and means for distributing the encrypted copy of the electronic document file. The means for storing at least one electronic document file stores an electronic document file based at least in part on a source electronic document provided by a content provider, where the source electronic document is an electronic version of a printed document.

The means for encrypting a copy of the electronic document file encrypts the copy of the electronic document file with a key defining at least one right associated with the client that sent the request and is in operable communication with the means for storing and the means for receiving. The right defines at least one action capable of being performed on at least a portion of the copy of the electronic document file. The means for distributing the electronic document file is in communication with the means for encrypting and provides a copy of the encrypted electronic document file and the key to the client requesting a copy of the electronic document file.

Additional embodiments of the invention may include the following. In one embodiment, the system further comprises a means for converting the source electronic document into an electronic document file. In one embodiment, the system further comprises a means for reading the electronic document file.

In another aspect, a system implemented in accordance with at least one embodiment of the invention includes a reader, a data server module, and a data converter module. The data converter module communicates with content providers, such as publishers, to receive document layouts (e.g., magazine layouts) that correspond to the actual print versions of the published document. The data converter module converts the received document layout information to an enhanced document having a predetermined format such as the portable document format (PDF). This format matches the format of the images and text as they appear on the magazine pages. In at least one embodiment, the enhanced document format adds additional information, such as links, to the document. The data server module communicates with the reader to send that actual content (e.g., magazines), updates to content, and other requested information, to the reader. The user of the reader uses the reader to read the magazine. The reader communicates with the data server module to receive content and send communications from the user and user information, including requests to purchase or subscribe to a particular periodical. The reader can also provide the data server with magazine usage and/or readership information.

In at least one embodiment, the reader is embodied on a computing device that uses two color liquid crystal display (LCD) screens to provide an electronic magazine system having the "look and feel" of a conventional magazine. The device does not require a keyboard for the user to transmit information to the data Server. Instead, software running on the device displays onscreen buttons that permit the user to touch the buttons to send messages and communicate with the data Server (e.g., send messages, select magazines to receive, "dog ear" a particular page being read, add a bookmark, tear out pages—virtually any action that the user can do with a conventional printed paper magazine). As will be described herein, in at least one embodiment, the systems and methods of the invention provides additional enhancements for users that are not available or possible with the conventional printed magazine experience. For example, by touching predetermined parts of the displayed page, the user can indicate that he or she wants to receive additional information relating to some part of the page, wants specific information relating to the particular area he or she is touching, or that the user wants to purchase a product or service offered for sale (which is being touched) via the publication. For example, in an embodiment, a user can, using just the wireless reader device, easily and instantly place an order for any product or service advertised in the magazine by an advertiser capable of receiving electronic order from the data server module.

In at least one embodiment, the electronic magazine system includes a hard wired local area network (LAN) link to the reader to allow rapid updating of content or access to archived back issues. In addition, the electronic magazine system provides wireless data transfer to enable real time e-commerce transactions in response to advertisements.

Embodiments of the invention may provide other advantages and features such as:
- Drag and Snap panning of display.
- Targeting and immediate fulfillment of direct marketing offers.
- Seamless 2 page spread display and navigation.
- User interactions to support electronic commerce in digital magazines and catalogs.
- Subscription reminder/checker for periodic content.
- Instant delivery of print layout version of content.
- Read/Browse interaction for reading digital material.
- Automatic page determination for article clipping.
- Functionality based on rights of content components
- Pass along tracking
- Usage tracking, which may be tied to page and/or content, and which can occur offline
- Page clipping function
- Business process to publish digital content in print layout form
- Subscription management, including payment
- Subscription or single copy purchase at a single location.
- Unique page turn animation that includes images of front and back of pages, dynamic shadowing & realistic animation
- Digital rights management at the object (picture, article, etc.) level
- Seamless integration of multimedia elements (audio, animating, video) into the electronic document.
- A "newsstand" purchase, download & read concept
- An overall system architecture that includes a licensing server, consumer database, subscriber database, circulation database and journaling (capturing magazine usage data.)
- Addition of page, magazine plus page and web site hyperlinks to magazine pages
- Automatic detection of in-article URL's and hyperlinking
- Page tearing animation including page or article images and realistic animation
- Read Mode animation—zooming in to article to read in detail
- Magazine pass-along including adding original end-user's licensing information to ZNO file and adding new end-user's licensing information
- A proprietary ("ZNO") file format
- Real-time anytime anywhere broadband wireless communication.
- Legibility as good as paper magazine.
- Browse (flip pages) and specific page access modes (info hierarchy)
- Open standard data format
- User's magazine experience is not diluted by extra functionality Details relating to this and other embodiments of the invention are described more fully herein.

BRIEF DESCRIPTION OF THE FIGURES

The advantages and aspects of the present invention will be more fully understood in conjunction with the following detailed description and accompanying drawings, wherein.

The drawings are not necessarily to scale, emphasis instead generally being placed upon illustrating the principles of the invention.

DETAILED DESCRIPTION

As used herein, the Internet refers at least to the worldwide collection of networks and gateways that use the transmission control protocol/Internet protocol (TCP/IP) suite of protocols to communicate with one another. The World Wide Web (WWW) refers at least to the total set of inter-linked hypertext documents residing on hypertext transport protocol (HTTP) servers all around the world. As used herein, the WWW also refers at least to documents accessed on secure servers, such as HTTP servers (HTTPS), which provide for encryption and transmission through a secure port. WWW documents, which may be referred to herein as web pages, can, for example, be written in hypertext markup language (HTML). As used herein, the term "web site" refers at least to one or more related HTML documents and associated files, scripts, and databases that may be presented by an HTTP or HTTPS server on the WWW. The term "web browser" refers at least to software that lets a user view HTML documents and access files and software related to those documents.

Systems and methods in accordance with the invention can be implemented using any type of general purpose computer system, such as a personal computer (PC), laptop computer, server, workstation, personal digital assistant (PDA), mobile communications device, interconnected group of general purpose computers, and the like, running any one of a variety of operating systems. In some embodiments, systems and methods implemented in accordance with the invention may incorporate and/or be usable with readers and reading devices capable of reading electronic contents, such as "electronic books," tablet and notebook computers and screens, and the like. An example of a general-purpose computer system 10 usable with at least one embodiment of the present invention is illustrated in FIG. 1.

Figure 1:
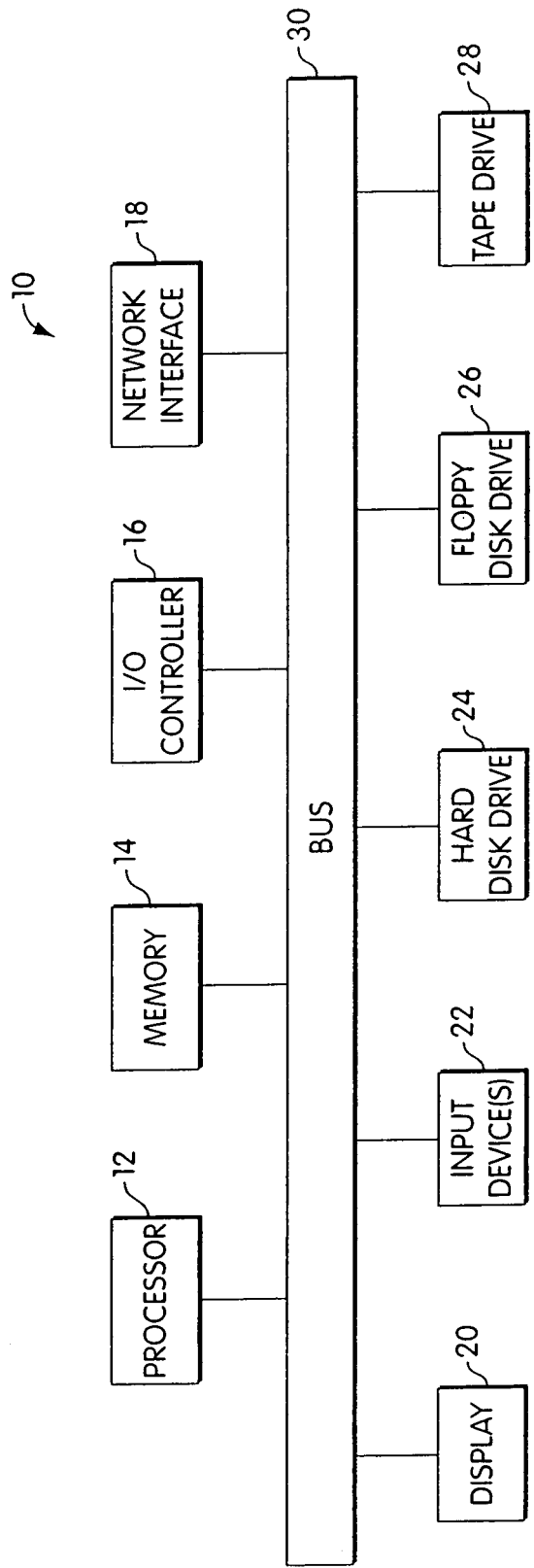
FIG. 1 is an illustration of a computer system in which at least one embodiment of the present invention can be embodied.

Referring briefly to FIG. 1, the general purpose computer system 10 includes a central processor 12, a main memory unit 14 for storing programs and/or data, an input/output controller 16, a network interface 18, a display device 20, one or more input devices 22, a fixed or hard disk drive unit 24, a floppy disk drive unit 26, a tape drive unit 28, and a data bus 30 coupling these components to allow communication therebetween.

The central processor 12 can be any type of microprocessor, such as a PENTIUM processor, made by Intel of Santa Clara, Calif. The display device 20 can be any type of display, such as a liquid crystal display (LCD), cathode ray tube display (CRT), light emitting diode (LED), and the like, capable of displaying, in whole or in part, the outputs generated in accordance with the systems and methods of the invention. The input device 22 can be any type of device capable of providing the inputs described herein, such as keyboards, numeric keypads, touch screens, pointing devices, switches, styluses, and light pens. The network interface 18 can be any type of a device, card, adapter, or connector that provides the computer system 10 with network access to a computer or other device, such as a printer. In one embodiment of the present invention, the network interface 18 enables the computer system 10 to connect to a computer network such as the Internet.

Those skilled in the art will appreciate that computer systems embodying the present invention need not include every element shown in FIG. 1, and that equivalents to each of the elements are intended to be included within the spirit and scope of the invention. For example, the computer system 10 need not include the tape drive 28, and may include other types of drives, such as compact disk read-only memory (CD-ROM) drives. CD-ROM drives can, for example, be used to store some or all of the databases described herein.

In at least one embodiment of the invention, one or more computer programs define the operational capabilities of the computer system 10. These programs can be loaded into the computer system 10 in many ways, such as via the hard disk drive 24, the floppy disk drive 26, the tape drive 28, or the network interface 18. Alternatively, the programs can reside in a permanent memory portion (e.g., a read-only-memory (ROM)) chip) of the main memory 14. In another embodiment, the computer system 9 can include specially designed, dedicated, hard-wired electronic circuits that perform all functions described herein without the need for instructions from computer programs.

In at least one embodiment of the present invention, the computer system 10 is part of a client-server system, in which a client sends requests to a server and a server responds to requests from a client. That is, the computer system 10 can be either a client system or a server system. In one embodiment, the invention is implemented at the server side and receives and responds to requests from a client, such as a reader application running on a user computer.

The client can be any entity, such as a the computer system 10, or specific components thereof (e.g., terminal, personal computer, mainframe computer, workstation, hand-held device, electronic book, personal digital assistant, peripheral, etc.), or a software program running on a computer directly or indirectly connected or connectable in any known or later-developed manner to any type of computer network, such as the Internet. For example, a representative client is a personal computer that is x86-, PowerPC®, PENTIUM-based, or RISC-based, that includes an operating system such as IBM®, LINUX, OS/2® or MICROSOFT WINDOWS (made by Microsoft Corporation of Redmond, Wash.) and that includes a Web browser, such as MICROSOFT INTERNET EXPLORER, NETSCAPE NAVIGATOR (made by Netscape Corporation, Mountain View, Calif.), having a Java Virtual Machine (JVM) and support for application plug-ins or helper applications. A client may also be a notebook computer, a handheld computing device (e.g., a PDA), an Internet appliance, a telephone, an electronic reader device, or any other such device connectable to the computer network.

The server can be any entity, such as the computer system 10, a computer platform, an adjunct to a computer or platform, or any component thereof, such as a program that can respond to requests from a client. Of course, a "client" can be broadly construed to mean one who requests or gets the file, and "server" can be broadly construed to be the entity that downloads the file. The server also may include a display supporting a graphical user interface (GUI) for management and administration, and an Application Programming Interface (API) that provides extensions to enable application developers to extend and/or customize the core functionality thereof through software programs including Common Gateway Interface (CGI) programs, plug-ins, servlets, active server pages, server side include (SSI) functions and the like.

In addition, software embodying the present invention, in one embodiment, resides in an application running on the computer system 10. In at least one embodiment, the present invention is embodied in a computer-readable program medium usable with the general purpose computer system 10. In at least one embodiment, the present invention is embodied in a data structure stored on a computer or a computer-readable program medium. In addition, in one embodiment, the present invention is embodied in a transmission medium, such as one or more carrier wave signals transmitted between the computer system 10 and another entity, such as another computer system, a server, a wireless network, etc. The present invention also, in an embodiment, is embodied in an application programming interface (API) or a user interface. In addition, the present invention, in one embodiment, is embodied in a data structure.

For the purpose of explanation, embodiments of the present invention will be discussed in connection with the example of systems and methods associated with distributing, procuring, accessing, reading, subscribing to, sharing, viewing, and/or storing electronic magazines. It should be understood, however, that the foregoing explanation of the embodiments of the present invention is equally applicable to other types of electronic documents as well, such as books, newspapers, periodicals, reports, papers, brochures, catalogs, manuals, and the like, as well as with other types of actions that can be taken with these documents.

Figure 2:
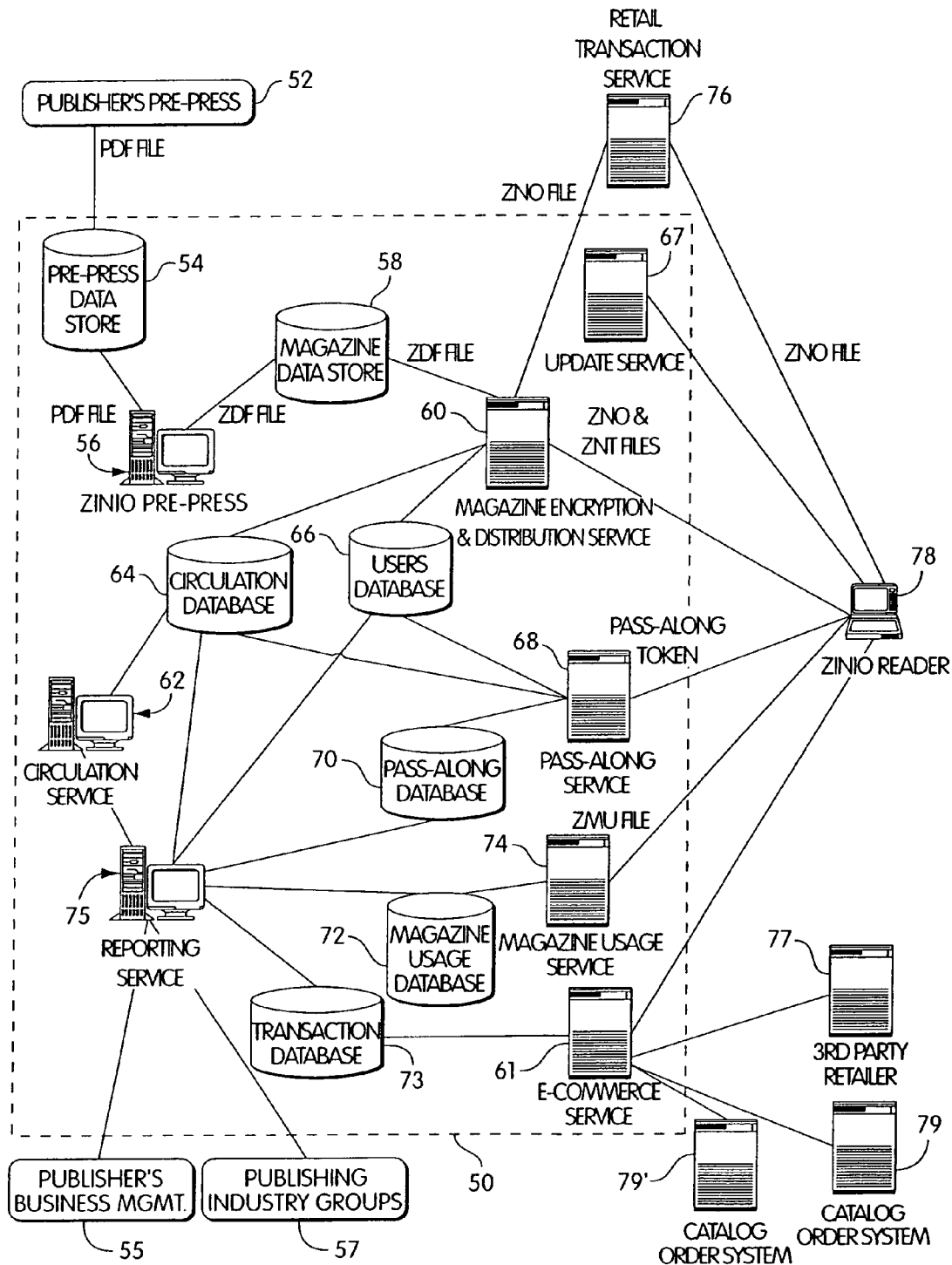
FIG. 2 illustrates an overview of a system according to one embodiment of the invention.

FIG. 2 illustrates an overview of the architecture of a representative system 50 implemented in accordance with one embodiment of the invention. The system 50 includes a pre-press data store 54, a proprietary pre-press service 56, a magazine data store 58, a magazine encryption and distribution service 60, a commerce service 61 (e.g., an electronic commerce (ecommerce) service), a circulation service 62, a circulation database 64, a users database 66, an update service 67, a pass-along service 68, a pass-along database 70, a magazine usage database 72, a transaction database 73, a magazine usage service 74, and a reporting service 75. Each service in the system 50 (e.g., the magazine encryption & distribution service 60, the e-commerce service 61, the circulation service 62, the update service 67, the pass-along service 68, the magazine usage service 74, and the reporting service 75), in one embodiment, is capable of controlling its respective service functions and responding to requests from the other services, and/or the reader 78, the retail transaction service 76, catalog order systems 79, 79', and/or the $3^{rd}$ party retailer 77'. In at least one embodiment, at least one of the services includes a processor.

The system 50 receives publications, such as magazines, from a publisher's pre-press 52. The publications are encoded in a document format such as the Portable Document Format (PDF), available from ADOBE Systems of San Jose, Calif. After converting these publications to a proprietary format, which is described herein, and after applying appropriate circulation and encryption operations, as described herein, the publications are made available to users who can view and/or read the publications using the reader 78, described herein. In at least one embodiment, the publications, after conversion and encryptions, are provided to third parties, such as a retail transaction service 76, which can then act as a provider for users using the reader 78.

The publisher's pre press 52 represents, in at least one embodiment, entities such as current publishers of print magazines, which typically supply their layouts in PDF, Quark or other well-known publishing program formats. In current (conventional printed) magazine production, the publisher's pre press 52 typically receives original artwork from clients and publishers (e.g. advertisers, agencies, etc.), and scans the artwork at low resolution (72 dots per inch (dpi) to high resolution (300 dpi). The publisher creates a composite page comprising the low-resolution artwork from the pre-press 52, plus text, graphics, and formatting, which results in a file format such as Quark. The pre-press 52 then converts the composite file to a raster image processor (RIP) file, such as tagged image file format (TIFF or TIFF-IT) or desktop color specification (DCS-2) format, a format used, for example, to exchange bitmap images between pre-press applications, substituting high resolution images for low resolution images. The pre-press 52 then sends the RIP file to a printer, where the plates are made from the RIP file, then the file is printed.

The pre-press data store 54, is a storage system, such as a database, that stores publications from publishers in their existing document (e.g., PDF files). These publications are generated by the publisher's pre-press house 52, but they also may be generated by another source capable of providing a publication in the requisite input format.

To be compatible with the conventional publisher pre-press process described above, in at least one embodiment, the present invention uses at least one of the following techniques for generating the PDF files.

In one embodiment, PDF files stored in the pre-press data store 54 are derived "live" with low resolution pictures by taking the files directly from the publisher, such as QUARK files, then creating the PDF file from the Quark file. One advantage of this method is that the proprietary pre-press service 56 need only deal with the publisher, but one disadvantage is that the pictures can sometimes have poorer quality than those created using other methods.

In one embodiment, prior to PDF generation, a high resolution picture is substituted for a low resolution picture by taking the Quark files directly from the publisher, taking a high resolution picture from a publisher pre-press system 52, substituting the high resolution picture for the low resolution picture, then creating the PDF file. One advantage of this method is that the pictures may be of better quality than with the low-resolution technique (in fact, this method often will produce the best quality pictures), but one disadvantage is that more parties may be involved in the creation of the file, which can increase the time that the process takes.

In one embodiment, prior to PDF generation, a pre-press system generates a medium resolution picture for use by the publisher prior to the publisher's creating a PDF or Quark file. Then, the proprietary pre-press service 56 takes the Quark/PDF file directly from the publisher and creates a file in a proprietary format, such as ZDF from it. One advantage of this method is that the picture quality is better than the low-resolution method, but not as good as the high-resolution method. Two disadvantages are that this method creates extra work for the pre-press system and that the "medium" level resolution can vary for different publications because of different sized pages.

Referring again to FIG. 2, the proprietary pre-press service 56 (which, by way of example is shown in FIG. 2 as a "Zinio pre-press") is a service that manages access to publisher PDF files as they are converted into a proprietary data format. In at least one embodiment, the proprietary pre-press service 56 acts as a data converter and organizer, which converts files stored in the pre-press data store 54 to a digital picture format and adds the interaction elements to create the electronic magazine of the invention. In at least one embodiment, the proprietary pre-press service 56 also organizes information provided by the publisher and transmitted to the user (e.g., updates, subscription information, offers for new services and publications, and the like).

By way of example, in the embodiment shown in FIG. 2, the publisher PDF files are converted to a format called Zinio data Format (ZDF). In one embodiment, this is done by adding data to the PDF file that the reader 78 will interpret in a pre-determined way. For example, certain data added will permit the reader 78 to link a given document to an audio or video file. In this example, the ZDF format is similar to the PDF format in that the on-screen electronic document will look "exactly like" the conventional printed paper version of the document, but the ZDF format differs from the PDF format in that the ZDF format permits more interaction elements that appear in the document. For example, in the ZDF format, readers of the document can click on various areas of the document to hear audio files, interact with advertisers, go directly to web links, get additional information, etc. Referring again to FIG. 2, the magazine data store 58 stores ZDF files, ready for encryption by the magazine encryption and distribution Service 60.

The magazine encryption and distribution service 60 is a service that interfaces with the reader 78 to validate the user, conduct the commercial transaction, and determine which magazine to deliver. In addition, the magazine encryption and distribution service 60 performs the encryption process to convert a ZDF file into a ZNO file (this process is explained more fully herein).

The commerce service 61 of the system 50 manages the commerce transaction requests from the reader 78 and interfaces with $3^{rd}$ party retailers 77 and/or catalog order systems 79, 79', to manage orders on behalf of the user of the reader 78. The catalog order systems 79, 79' are systems owned by catalog companies that are used to receive and process orders. The commerce service 61 enables the user of the reader 78 to order and/or obtain further information about manufacturers and/or goods appearing in the magazines that the user browses/reads using the reader 78. These features are explained more fully herein.

The circulation service 62 is a service that generates various reports from the circulation database 64. The circulation database 64 stores circulation information for billing, auditing and other reporting purposes. The circulation service 62 also provides data to the reporting service 75.

The users database 66 stores user information regarding the magazine issues the user has downloaded and the keys for those downloads. The user's individual key is also stored here.

The update service 67 updates the configuration of the reader 78 when the user enters the "newsstand" area of the reader 78. The update service 67 is explained more fully herein in connection with FIG. 7.

Pass along refers to the practice of one user "passing along" his or her copy of a magazine. Pass-along is a key practice in the magazine industry, and at least one embodiment of the invention supports the practice of sharing magazines. For example, this is accomplished by using the keys that were assigned when the files were downloaded. The pass-along service 68 receives pass-along requests and determines whether an access key should be sent. If access is granted, the pass-along service 68 also encrypts the key for transmission to the reader 78. The pass-along database 70 stores access rights pertinent to each issue for reference in determining pass-along access. Pass-along is explained more fully herein. The pass-along database 70 stores access rights pertinent to each issue for reference in determining pass-along access.

The magazine usage database 72 stores usage data collected from the reader 78, and the magazine usage service 74 collects magazine usage data from the reader 78.

The reporting service 75 has access to the users database 66, the circulation database 64, the pass-along database 70, and magazine usage database 72. The reporting service 75, when requested by another entity (e.g., a client, which can, for example, be a publisher) generates reports from information stored in these databases. In at least one embodiment of the invention, the reporting service 75 gathers data from the various databases in the system 50, including the users database 66 for demographics, and aggregates the data into various reports. For example, the reporting service 75 can generate reports based in information in the circulation database 64 to satisfy a publisher's audit reporting requirements. In at least one embodiment, the reporting service 75 works with one or more of the other services in the system 50 (e.g., the circulation service 62, the magazine encryption and distribution service 60, the pass-along service 68, and/or the magazine usage service 74) to gather specific data relating to the reading of the magazines (e.g., advertisement responses and orders). This is discussed more fully herein.

The retail transaction service 66 is a service at a third party retailer that handles the commercial transaction for the purchase of a magazine and then requests the download file from the magazine encryption and distribution service 60 for delivery to the user. For example, a third party retailer such as AMAZON.COM can host a retail transaction service 66.

The $3^{rd}$ party retailer 77 represents a system owned by a $3^{rd}$ party retailer to receive and process orders, and to provide information, as requested.

The reader 78 (which is labeled in FIG. 2 by way of example only as a "Zinio reader") includes client software that provides the user interface into the system as well as access to the documents. In at least one embodiment, the reader 78 functions are accomplished by running client software on a general purpose computer (such as the one described previously). In other embodiments, the reader 78 functions are accomplished by running client software on any device capable of displaying the magazines in a readable format, such as a dedicated electronic book reading devices. For example, future versions of devices such as the SOFTBOOK family of devices (available from GEMSTAR E-book of Redwood City, Calif.), which have the requisite display and processing power, can be used to run the reader 78. In at least one embodiment, the system 50 employs one or more of the following security features. For example, communication links such as with components outside of the system 50 and/or the reader 78 occur over a secure channel, such as direct lines, virtual private networks (VPNs), or secure sockets layer (SSL) links. Internally, databases that contain sensitive user information (e.g., credit card numbers) are encrypted, such as at the field level. In at least one embodiment, only those data elements that are sensitive are encrypted. This can allow quicker access to the records in the databases. In another example embodiment, access to internal servers and databases is secured by firewalls and through the limited use of trusted hosts.

In one embodiment, physical access to the servers and databases is be regulated. For example, in one embodiment, individual access to machines and applications requires login ID's and passwords. In at least one embodiment, biometric security devices are used for authentication and/or identification. In some embodiments, intrusion tests are conducted to determine any unforeseen vulnerabilities.

Figure 3:
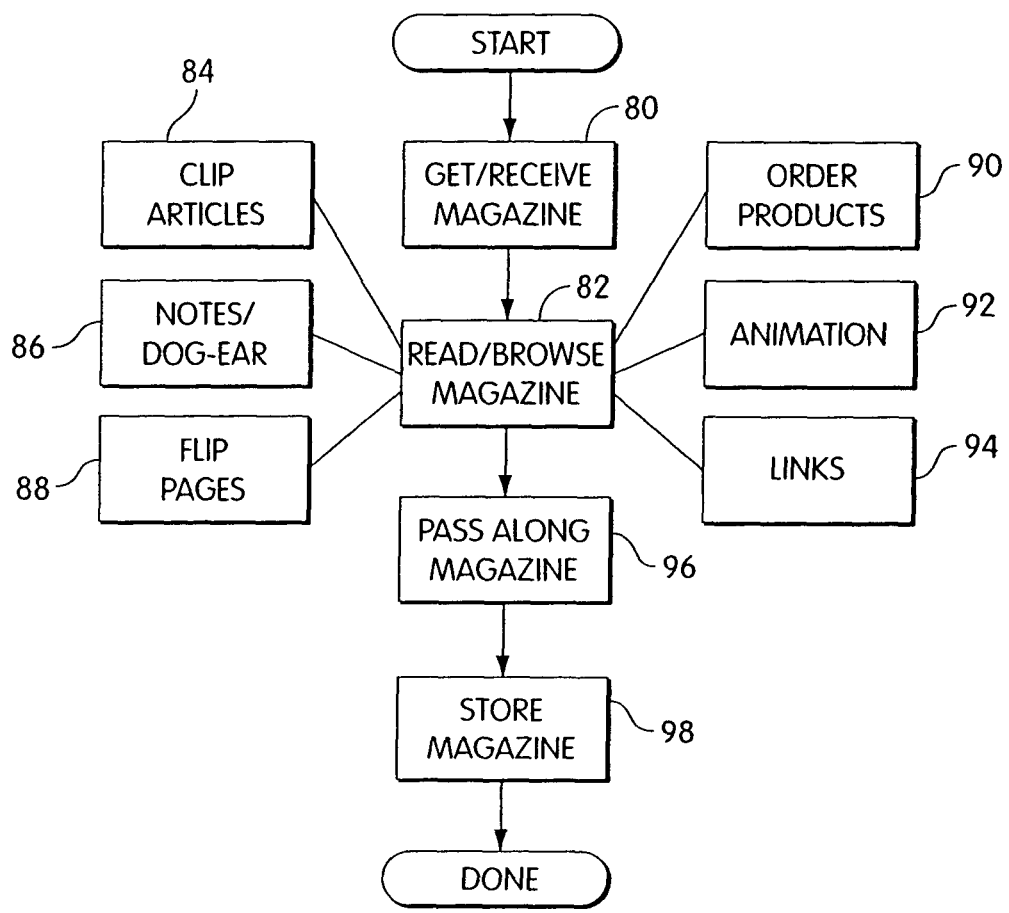
FIG. 3 is a flow chart illustrating some of a user's interactions with the reader of FIG. 2, in accordance with an embodiment of the invention.

As described herein, using the system 50 shown in FIG. 2, along with a reader 78 programmed to interact with the system 50, users can access and acquire content, such as electronic magazines and other periodicals, and seamlessly interact with the content they acquire. FIG. 3 is a flow chart illustrating, at a high level, some of a user's possible interactions with the reader 78 of FIG. 2, in accordance with an embodiment of the invention. For example, users can get the magazine they want to read (step 80) in ways similar to those used with conventional printed magazines: via subscription, single copy purchase, from a user's archive of magazines (e.g., like an electronic "bookshelf" or "magazine rack"), or even after a magazine has been passed along from another user.

After acquiring the magazine (step 80), a user reads and/or browses the magazine (step 82) on the screen of the device running the reader 78 (e.g., on the screen of a computer, a PDA, an "electronic book" reading device, etc.). In accordance with an embodiment of the invention, in addition to reading the document in a manner similar to reading a conventional magazine, the user is able to perform other "conventional" functions, such as clipping articles (step 84), marking or tabbing (also referred to as "dog ear") pages (step 86), and flipping pages with realistic animation (step 88). The user also is able to perform "non-conventional" functions that go beyond the capabilities of conventional printed documents, such as interacting with advertisers and/or ordering products (step 90), viewing animations associated with the magazine and/or content therein (step 92) and utilizing links (step 94) to view other content, web sites, files (including audio and video files), information, etc.

As with many conventional magazines, the user can pass along the magazine, or at least a portion of it, to another user/reader (step 96), if desired and allowed. Unlike conventional magazines, however, in some embodiments of the invention, the rights associated with the magazine permit the original user to still have access to at least a portion of the magazine even though the magazine (or at least a portion of it) has been passed along to another. In at least one embodiment of the invention, however, when a user passes along a magazine or a portion of the magazine, the user loses access to what was passed along. If desired, the magazine is stored in an archive (step 98) for future access, reading, and browsing.

Figure 4:
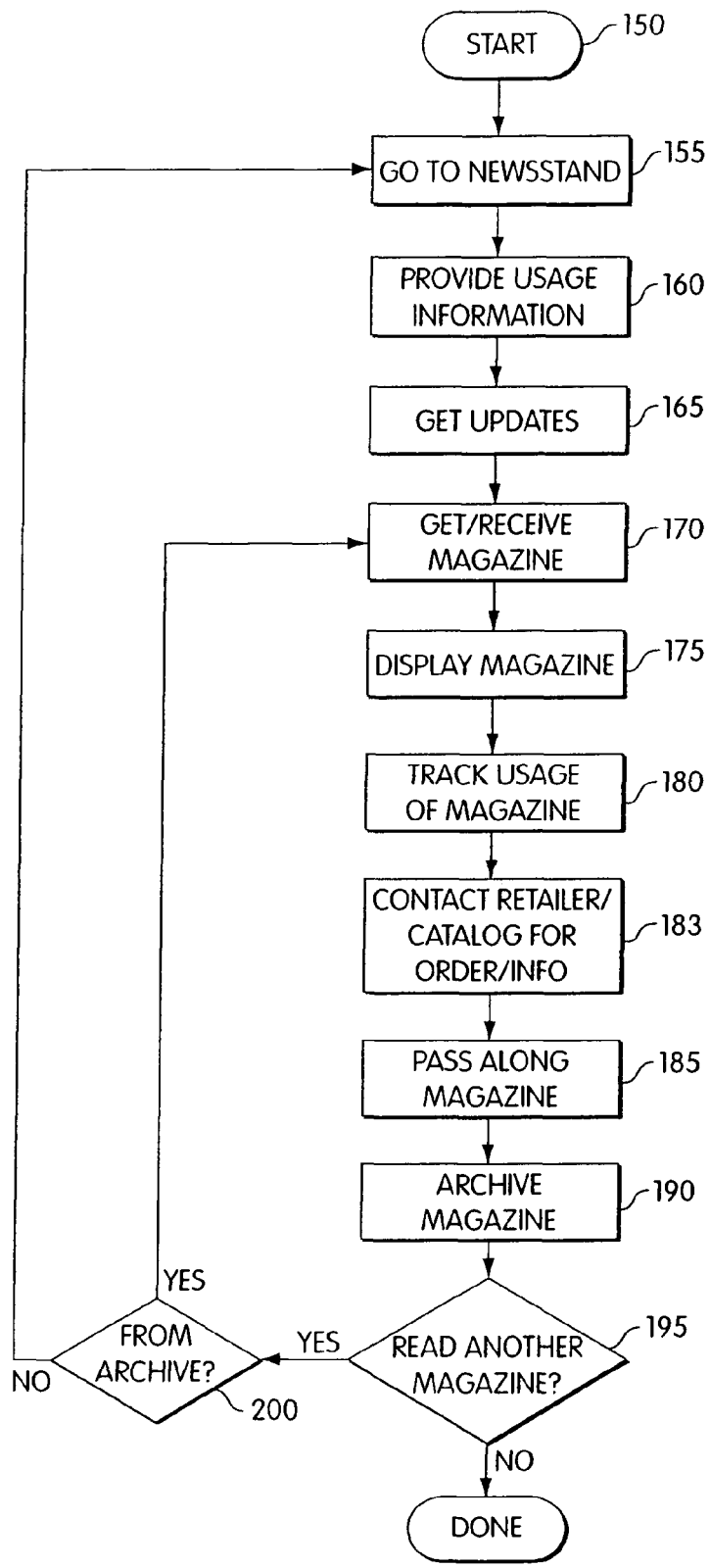
FIG. 4 is a flow chart illustrating some of the reader's interactions with the system of FIG. 2, in accordance with an embodiment of the invention.

To accomplish some of the actions shown in the flowchart of FIG. 3, the reader 78 interacts with the system 50 of FIG. 2. FIG. 4 is a flow chart showing, at a high level, the types of interactions that a reader 78 has with the system 50, along with other actions the reader 78 may take, in accordance with an embodiment of the invention. Note that each of the actions shown in FIG. 4 is explained in greater detail in the examples and figures described herein.

Referring to both FIG. 2 and FIG. 4, to begin the interaction, a user goes to an area of the reader 78 called a "newsstand" (newsstands are explained more fully herein). When the reader 78 determines that the user has entered the newsstand area (step 155), the reader 78 connects to the system 50. If usage information is available (e.g., about the magazines that that the user has viewed), the reader 78 provides that information to the magazine usage service 74 (step 160). For example, in the embodiment of FIG. 2, the reader 78 (which by way of example only is called a "Zinio Reader") sends a file called a "Zinio Magazine Usage" (ZMU) file to the magazine usage service 74. As explained further herein, if the user has not previously viewed any magazines, or if this is the first time that a user is entering the newsstand, the reader 78 may not have usage information to provide to the magazine usage service 74.

If the reader 78 requires updating, the reader 78 gets update files from the update service 67 (step 165). The system 50 then provides to the reader 78, through the magazine encryption and distribution service 60, access to at least one magazine in the magazine data store 58. If the user wants to purchase the magazine (or to get a copy of the magazine, if the user has a subscription), the user selects it (step 170), and the magazine is provided to the reader 78, so that the reader 78 can display it (step 175). For example, in the example embodiment of FIG. 2, the magazine is provided in a proprietary format called a ZNO file.

While the user is reading the magazine, the reader 78 tracks usage (step 180), such as which articles were browsed, which were read, which were skipped, how long a user spent on an article, whether an article was torn out, whether an article was re-read, etc. In at least one embodiment of the invention, to address privacy concerns, the reader 78 does not record personally identifiable information as part of the magazine usage data and the user is free to view the log of magazine usage data.

If the user wants to order a product or contact a retailer, the reader 78 communicates the information to the commerce service 61 (step 183), which contacts the retailer on behalf of the user.

If the user wants to pass the magazine along to another entity (e.g., to an organization or to another user), the reader 78 communicates the pass along information to the pass-along service 68 (step 185). If the user wants to store or archive the magazine, the reader 78 archives the magazine in a location designated by the user (step 190). The steps of FIG. 4 can be repeated (step 190) if the user wants to read/browse additional magazines, whether from the newsstand or from the archive (step 200).

Having outlined the features that at least some embodiments of the invention provide, the operation of the system 50 and the reader 78 is now discussed in greater detail, in accordance with an example embodiment of the invention.

Figure 5:
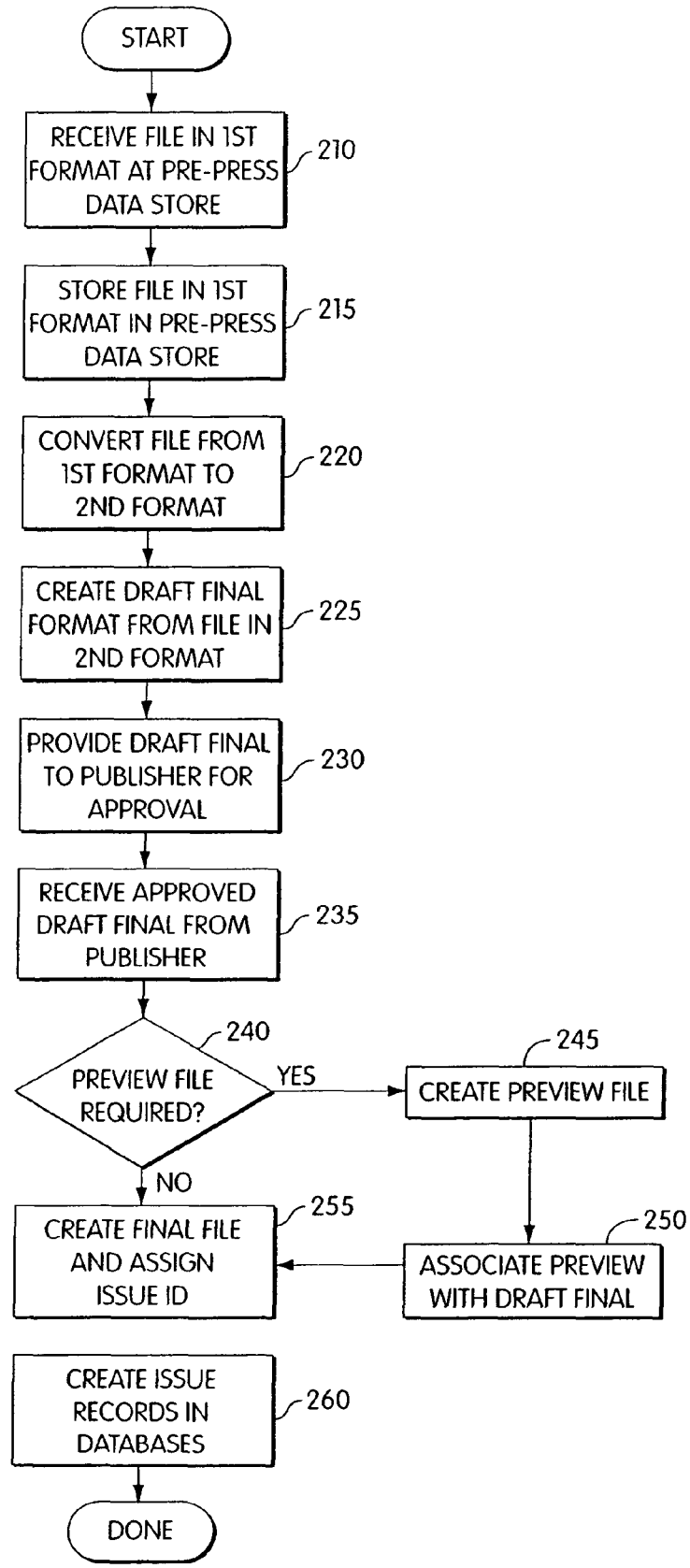
FIG. 5 is a flow chart illustrating a method for creating a digital magazine file, in accordance with one embodiment of the invention.

FIG. 5 is a flow chart illustrating a method for creating a digital magazine file, in accordance with one embodiment of the invention. Referring to FIGS. 2 and 5, the process for getting files into the magazine date share starts when a PDF file is received at (or entered into) the pre-press database (step 210). The PDF file represents the printed version of the magazine at the desired resolution for display purposes. For example, as described previously, the publisher's pre-press house, a third party pre-press house, or a proprietary pre-press service may generate these files. Regardless of the source, the PDF files are stored in the pre-press data store 54 (step 215).

The proprietary pre-press service 56 then uses the files from the pre-press data store 54 to create the proprietary data format (e.g., ZDF) files by adding links and other metadata consistent with the final proprietary (e.g., ZNO) data format (step 220). Initially, an application such as ADOBE ACROBAT is used, in one embodiment, to manually create the links. In some embodiments of the invention, however, the system 50 uses a more automated process. One such embodiment automates the generation of data according to the proprietary ZDF format, based on input from a user that is unaware of the details of the format, using tools that describe the desired outcome. One embodiment takes a data file from the content provider describing the link (e.g., location on page and target) and data to be associated with the links, and programmatically creates the links in the ZDF file. One embodiment utilizes search engines to scan the contents of the original file for certain keywords that are specified in at least one other data file and create links to content/targets specified in the other data file that are associated with the keywords. The resulting proprietary data format file (which for purposes of example is a PDF file) is then stored in the magazine data store(s) 58.

In one embodiment, a draft final proprietary file in the proprietary final file format (which, for purposes of example, is called "ZNO") is created to allow the publisher to review the document for quality control (steps 235 through 235). In addition, in an embodiment, magazine preview files, if required (step 235), are also created at this point from the publisher's PDF file (step 255). The preview file contents can, for example, include the cover, the table of contents, and one or two pages from a lead article. The size of the preview file typically is not as large as that of the magazine file (e.g.) less than 500K bytes). The preview file is associated or linked to the main file for the magazine (step 250).

When the system 50 puts the ZDF files in the magazine data store 58, the following activities occur. The issue of the magazine is assigned an IssueID (step 255). In addition, records of the issue (called "IssueID record) are created and initialized in the circulation database 64 and the magazine usage database 72 (step 260). Records of the issue also may be created and initialized if desired, in the pass-along database 70, and set to desired predetermined values. In one embodiment, the publisher of the magazine may provide desired information for the IssueID record in the pass-along database 70. At this time, the magazine industry has yet to standardize on the format for transferring the digital version of magazines, so a variety of data formats now exist for the various elements of a magazine. There are also variances between the publishers and publications. To get the PDF file that starts the process, according to one embodiment of the invention, a conversion process is tailored to each publication, to bring each publication online.

In one embodiment, to support functions that may require synchronization across hardware located in various time zones, Greenwich Mean Time (GMT or UCT) is the time base used in the system of FIG. 2. Where appropriate, UCT is translated into the local time. In at least one embodiment of the invention (not shown), the system 50 uses a timeserver, with National Institute of Standards and Technology (NIST) timeservers as backup. In this embodiment, the timeserver of the system 50 gets its synchronization from the NIST timeservers. The time is synchronized as frequently as necessary.

In accordance with an embodiment of the invention, the core of its digital distribution is controlling how the contents of the digital files are used, allowing access to authorized users in a manner consistent with the rights granted to the user and denying access to unauthorized users. However, the rights management process of the invention can change depending on the digital rights management (DRM) selected for use with the system 50. The following describes an example rights management system in used accordance with at least one embodiment of the invention.

Controlled access to the digital content of the magazine files relies on the encryption algorithm used and the management of the keys used for the algorithm. In one embodiment of the system 50, content is encrypted with user keys, not hardware keys. In one embodiment, to meet export requirements for international use, the key length is limited to 64 bits.

Figure 6:
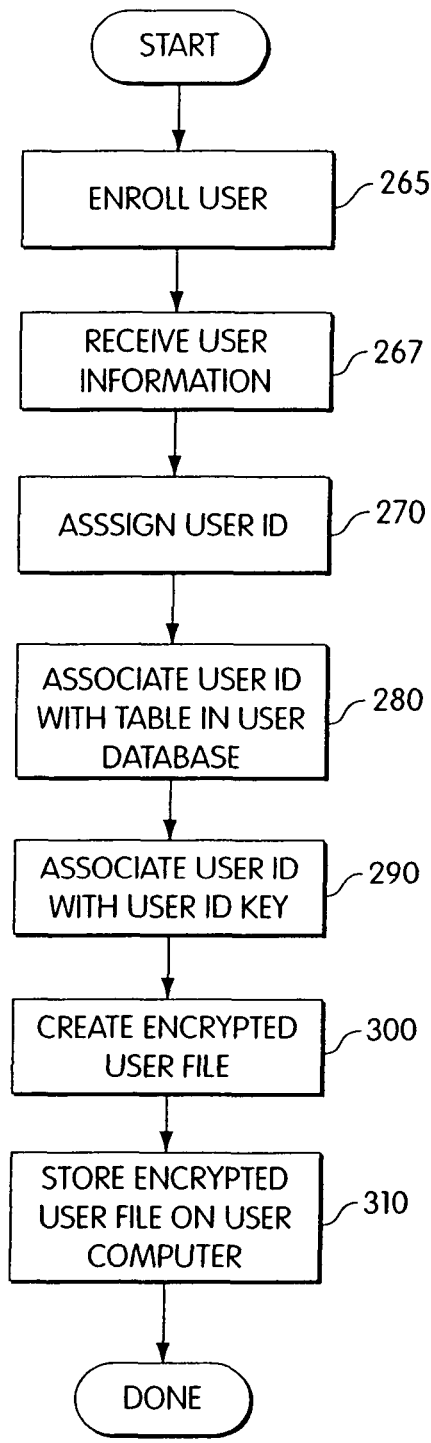
FIG. 6 is a flow chart illustrating a method for enrolling a user to the system of FIG. 2, in accordance with one embodiment of the invention.

FIG. 6 is a flow chart illustrating a method for enrolling a user to the system of FIG. 2, in accordance with one embodiment of the invention. When signing up via the reader 78 (steps 265 and 267), each user is assigned an internal userID number (step 255) that the user doesn't see. In this embodiment, because the user's electronic mail ("email") address is used as the user login, this allows a user to change email addresses and still access the user's archived issues (archiving is explained more fully herein). The user login, password, userID and userID key (explained below) are stored in an encrypted user file on the reader 78 (note that the reader 78, in some embodiments of the invention, comprises an application providing the reader 78 functionality, which application is running on a computer or other device).

The next time the user logs in, the userID is retrieved from the file to open the various magazine files. When the user logs into a PC that is not aware of the user, the reader 78 goes online and verifies that the user is a valid user, at which time the user login, password, userID and userID Key are retrieved from the system server and added to the PC's encrypted user file. In one embodiment, when a user changes his or her email address for logging in, the process requires logging into the system server, so that the encrypted user file will be updated when the email login is updated system.

On the system server, each userID is associated with a table in the user database (step 280). Table 1 is a representative example showing what the table in the user database contains:

TABLE 1

| userID | userID Key (for Issue Key encryption) | | |
|--------|---------------------------------------|---|---|
| IssueID | Issue Key | Pass Along count for issue | Download count |
| IssueID | Issue Key | Pass Along count for issue | Download count |

Referring to Table 1, the IssueID's are the identifiers for the issues the user has purchased. For example, assuming an average of 20 magazines/month*12 months/yr.*75 years=18,000 issues on average/user. Thus, for example, Table 1 is constructed and arranged to account for storage and organization of this many issues for a given user.

In some embodiments of the invention, the "user" of the system 40 is not a single user, but rather a group of users (e.g., situations where there is group or corporate access). In at least one embodiment, group/corporate access, is more of a billing issue rather than a rights management issue. In one example, each member of a group opens the magazine individually rather than sharing a user login/password, so that an accurate circulation count can be achieved. In that example, each user account is associated with a group billing account. This also simplifies usage of the reader 78 by the user because the user does not have to logout and log back in when going between personal and group magazines.

Referring again to FIG. 6, an encrypted user file is created to store the user login, password, user ID, and UserID Key (step 300) and the encrypted user file is stored on the device being used as a reader 78, such as the user's personal computer, electronic book reader, PDA, etc., (step 310).

The file encryption and the encryption algorithm used, in at least one embodiment, depend on the digital rights management (DRM) system being used. Examples of DRM systems usable with the invention include DRM systems made by ADOBE (e.g., Intertrust), CONTACT GUARD (of Bethesda, Md.), SEALED MEDIA (United Kingdom), MICROSOFT (Redmond, Wash.), and the like. Each issue of a magazine that a user has access to is associated with a key which is used to encrypt the file for transport to and storage on the reader 78 that the user is using. This key is then encrypted with the userID key for delivery to the reader application so that the reader 78 can open the magazine file when offline. In one embodiment, for the occurrence where the same key is used for the same user but for different issues, some random data that is later ignored is added to the key files. In one embodiment, the keys are 64 bits long. Those skilled in the art recognize, however, that the size of the key can vary, and may be expanded (for example to 512 bytes) to allow for future key expansions and to add noise to the files.

Using the two keys as defined may provide advantages to the system 50. For example, using the two keys as defined means that a pass-along copy can be accessed by just sending the download file key encrypted with the userID key of the new user. Thus, if the download file key is compromised, the download file key cannot be used on other files. In addition, a person "cracking" someone else's userID key would only be able to access those files accessible to the user whose userID key was cracked. Moreover, those issues would then have to be converted back into a standard format like PDF in order to be used. The same result would occur if an intruder determined the user login name and password. Thus, in at least one embodiment of the invention, "cracking" the userID key of a given user requires physical access to the reader 78 or other device (e.g., personal computer) on which the user has logged in before. Note that the userID key and subsequent issue keys cannot be used to open other issues or compromise other users.

Table 2 lists the keys in use and the locations of the keys in the system 50, in accordance with an embodiment of the invention.

TABLE 2

|  | Reader | System |
| --- | --- | --- |
| UserID Key | Encrypted Local users file | Clear User database |
| IssueID Key | Encrypted Issue Key file | Clear User database |

When transferring the UserID key from the system 50 to the reader 78, in one embodiment of the invention, an SSL connection is used to maintain a minimal level of security. The transfer of the IssueID can be either a secure or unsecure connection, depending on whether or not payment transactions were involved.

Once the content is secured, the various elements in the file are managed based on simple rights associated with each element in the file. Table 3 shows representative example of rights and elements contemplated in accordance with an embodiment of the invention.

TABLE 3

|  | Print | Tear for Sharing |
| --- | --- | --- |
| Editorials | Yes/No | Yes/No |
| Graphics | Yes/No | Yes/No |
| Pictures | Yes/No | Yes/No |
| Advertising | Yes/No | Yes/No |

Referring to Table 3, if the rights (e.g., print and/or tear) are not granted for a particular magazine element, that functionality is disabled for the specified magazine element. For example, a given set of rights for a given magazine may give user the right to print advertising, but not pictures or graphics. Those skilled in the art will recognize that rights other than printing or tearing (e.g., saving as a separate document, "cut and paste" type copying of portions of the magazine into another electronic document, modification of content), and the like, may or may not be spelled out for a given magazine.

In one embodiment, a publisher may require (via, for example, auditing requirements) that the electronic magazine being provided have its elements displayed with the exact same layout as the print version of the magazine. In this embodiment, the presence of the magazine element in the digital file assumes that the right to display the magazine elements in the original page layout has been granted.

In one embodiment, functions such as screen capture and print screen functionalities are not controlled at the application level. These functions may be operating system functions, and disabling these or other operating system functions may involve intercepting operating system calls when the application is running.

After the reader 78 has been enrolled with the system 50, the reader 78 can be used to visit the system 50, such as via a website, to acquire content and/or update applications running on the reader 78. In addition, in at least one embodiment, the system 50 is accessible to the reader 78 via a remote station, such as a terminal or "Kiosk" located at, for example, an airport. Each of these functions is described herein.

The system 50 notifies the reader 78 if an update is available and permits the reader 78 to update the software if necessary. For example, some reasons for updating the reader 78 are to add new functionality and/or correct previous functionality. In an embodiment of the invention, functionality changes can come in three types; file format changes, service interface changes and reader only changes, and a single update can contain one or more of the three types.

For example, as new functions are embedded in the magazine data files, new modules may be required on the reader 78 to interpret the new data elements. An example of this might be where a publisher is now providing a feature, such as a product sample, in a magazine, and the sample may have features not easily available or simulatable given the current configuration of the reader 78. For example, many fashion magazines now include inserts containing fragrance samples. If a reader 78 has access to functionality (such as a computer operably coupled to one or more external devices) capable of replicating the scent of the fragrance and somehow providing the simulated fragrance to the user, the magazine may include a data file to do this. Readers 78 unable to read such files could obtain updates from the system 50. An update to the reader 78 adds the necessary modules to handle the new data elements. In at least one embodiment of the invention, new data elements are ignorable so that if the user of a reader chooses not to update, the content can still be viewed subject to the limitations of the non-updated reader 78.

In another example, the update may include service interface changes. Service interface changes are related to the manner in which the reader communicates with the system 50. Some examples of service interface changes, in accordance with an embodiment of the invention, are changes to the URLs used to support the reader functionality or changes to protocols used to communicate with the servers of the system 50. An update to the reader 78 makes the necessary changes to communicate with the servers using the new interface. In at least one embodiment of the invention, service interface changes have no impact on the user interaction with the system 50, the user will not notice the changes.

Another type of update performed in at least one embodiment of the invention includes changes that are made to the reader 78 only. These so-called "reader only" changes are changes that add or modify reader functionality that are not based on file format or service changes. Some examples include changes to the user interface, changes to search algorithms, and/or more efficient rendering algorithms. Those skilled in the art will recognize that many other types of updates are within the spirit and scope of the invention. Updates to the reader 78 modify the associated application as appropriate.

In one embodiment of the invention, there are two basic triggers to starting an update procedure:

Check of update service indicates a new version is available.

Check of file format version indicates that unsupported data elements are present The latter trigger can occur, for example, in third-party retail purchase and pass-along scenarios where the magazine file is obtained outside of the system 50 and/or the reader 78 standards.

In at least one embodiment of the invention, an update service check occurs when the user enters an area of the reader 78 called the "newsstand" area. The newsstand area corresponds to a part of the reader 78 that permits users to acquire new content, add subscriptions, change subscription information, purchase single copies of periodicals, and the like—actions that user might have access to at a conventional newsstand. In one embodiment, when the newsstand area of the reader is accessed, the reader 78 is connected over a computer network to the system 50. Note that, in some embodiments, the Newsstand on the reader 78 may, for example, contain cached information with which a user can interact, make decisions, provide information, etc., prior to actually connecting over the computer network to the system 50. In one embodiment, the update service check only occurs when a user accesses the newsstand of the reader 78, to limit the number of update check requests. In at least one embodiment, entering the newsstand requires a connection to the Internet or other appropriate computer network, so connecting to the update service will not be a problem.

The file format check occurs, in one embodiment, whenever a file is opened. The file format version number is checked to see whether it matches (or, for example, exceeds) the formats supported by the current reader. If the file format is not supported, the user is notified and prompted to update by going online and going to the Newsstand area. The steps involved in this are listed in FIG. 7, which is a flow chart illustrating a method for updating a user's computer system, in accordance with one embodiment of the invention.

Figure 7:
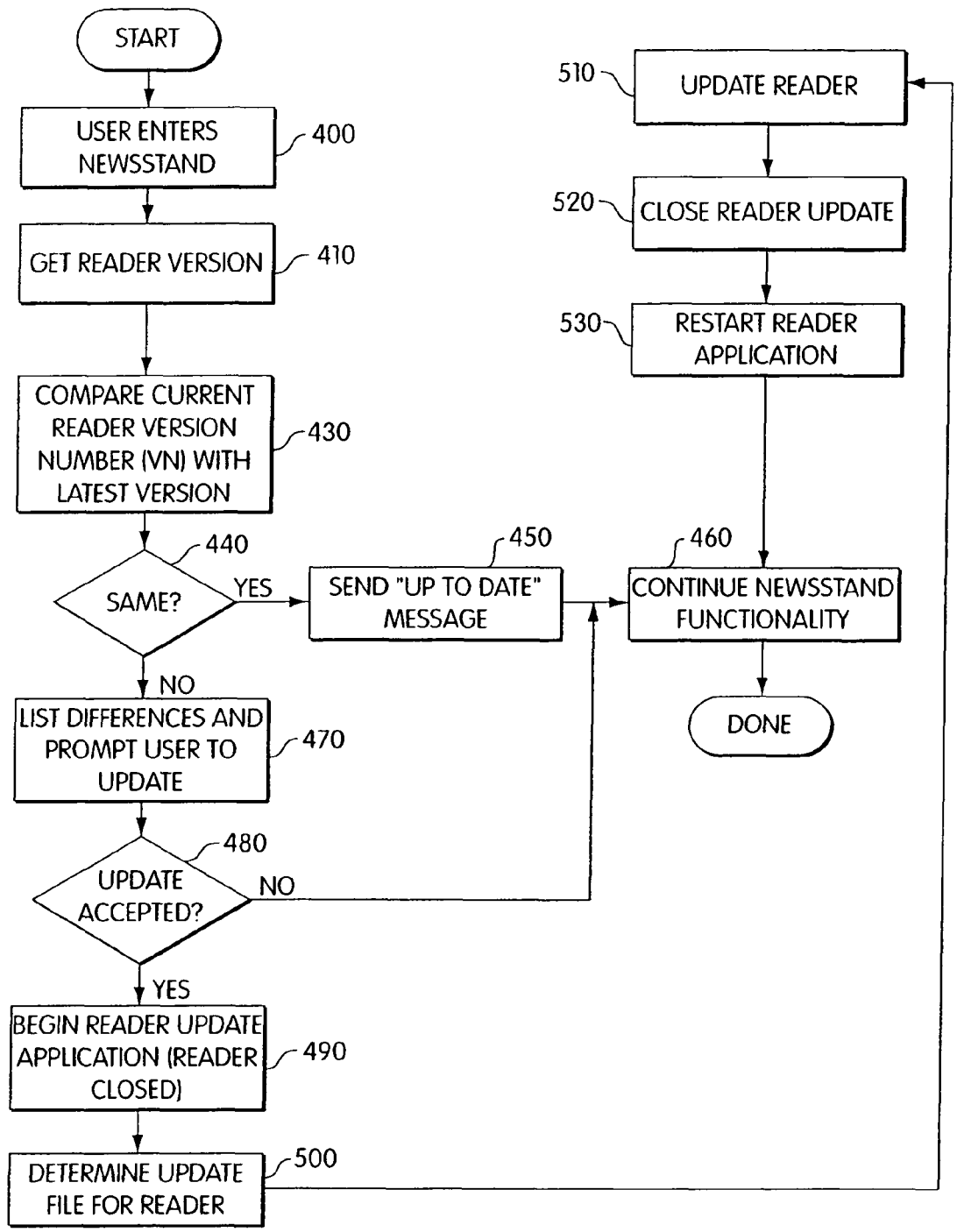
FIG. 7 is a flow chart illustrating a method for updating a user's computer system, in accordance with one embodiment of the invention.

Referring to FIGS. 2 and 7, when the user enters the newsstand (step 400) on the reader 78, data about the reader (for example, the reader version number) is provided to the update service (step 410), which, in one embodiment of the invention, is part of the magazine encryption and distribution service 60. In at least one embodiment, at least a portion of the communication between the reader 78 and the system 50 occurs over an SSL connection.

Referring again to FIG. 7, the system 50 compares the current reader version number (the one now on the reader 78) with what the system 50 knows to be the "latest" version of the reader 78 (steps 430 and 440). If the versions are the same, then the system notifies the reader 78 that it is up to date (step 450) and the reader 78 can continue working with the existing newsstand functionality (step 460).

If the versions are not the same, the system 50 provides the reader 78 with a list of differences between the current version and the latest version and a prompt for the reader 78 to be updated (step 470), which the reader 78 may display to a user. If the update is not accepted, the reader 78 continues working with the existing newsstand functionality (step 460). If the versions are not the same and the update is accepted (e.g., user of the reader 78 accepts the update), the reader update application begins (step 490). In at least one embodiment of the invention, when the reader update application begins, the reader 78 application closes. The reader 78 provides the system 50 with its version number and an update file request as part of the reader update application. The system 50 determines the update file to send to the reader 78 that will bring the reader 78 up to the latest version (step 500). The update file is sent to the reader 78, where the reader update application replaces relevant files and updates un-install script (step 510). The reader update application closes (step 520), and the reader application restarted (step 530) without a restart of the computer/reader device itself. The reader 78 is restarted in the newsstand area, so that the user of the reader 78 may continue with the newsstand functionality.

One reason for using a separate update application, as described in the flowchart of FIG. 7, is that the separate update application may help to minimize contention issues when updating various files on the reader 78. For example, in one embodiment, no update flags are used during updating, so each time the user enters the newsstand area of the reader, an update check is performed.

The handling of proxies and gateways for an Internet connection is, in one embodiment, managed by the services provided by the underlying operating system running on the reader 78.

Another type of updating that may occur when a user is using a reader 78 is an update resulting from checking the format of a file. In one embodiment of the invention, file checking occurs completely within the reader 78, so that no interaction with the update service area of the system 50 is required. Checking of file formats is explained more fully in FIG. 9, which described the actions occurring when a reader 78 is opening a file. In one embodiment, to simplify the checking of file formats, when a reader 78 supports a given version of a file format, the reader 78 will support all file format versions prior to the supported version. When the user of a reader 78 goes online and enters the newsstand area the normal service check and update process occur and update the application, as described in the flowchart of FIG. 7.

Other embodiments of the invention utilizing caching during updating. For example, in one embodiment, where the update files are static, caches of the update files are stored in one or more locations on the Internet or other computer network and are distributed via an edge service, such as that offered by like Akamai of Cambridge, Mass. The version comparison service, in this example, is part of the update service/cache.

When at the newsstand area of the reader 78, a user can utilize any of the newsstand's features, which, in at least one embodiment of the invention, include obtaining electronic documents such as magazines. The obtaining of electronic documents, in accordance with the invention, at least includes purchase of subscriptions and single purchase copies. In some embodiments of the invention, obtaining electronic documents includes one or more non-purchase situations, such as obtaining "free" publications such as sample issues, catalogs, manuals, gifts, and the like.

Subscriptions can be a significant factor for driving publisher revenues, but can be an area of frustration areas for magazine readers. Frustrations with subscriptions include difficulties in changing address or payment information, lengthy waits for subscriptions to start, and long waits to cancel or change subscriptions. In some embodiments, the present invention simplifies and improves the process of utilizing subscriptions to a magazine. In accordance with an embodiment of the present invention, the system 50 of FIG. 2 manages two types of subscriptions: the paid subscription and the controlled circulation subscription. One difference between the paid subscription and the controlled circulation subscription, as used with the present invention, is the manner in which the order is placed. In some embodiments of the invention, subscriptions (whether for oneself or as a gift) are placed only from the newsstand of the reader 78 and not from a retail transaction service 76, which permits single copy purchases only. However, in other embodiments of the invention, subscriptions and/or single copy purchases can be made from any entity capable of interacting with the system 50. These entities include, but are not limited to, readers 78 and retail transaction services 76.

Figure 8:
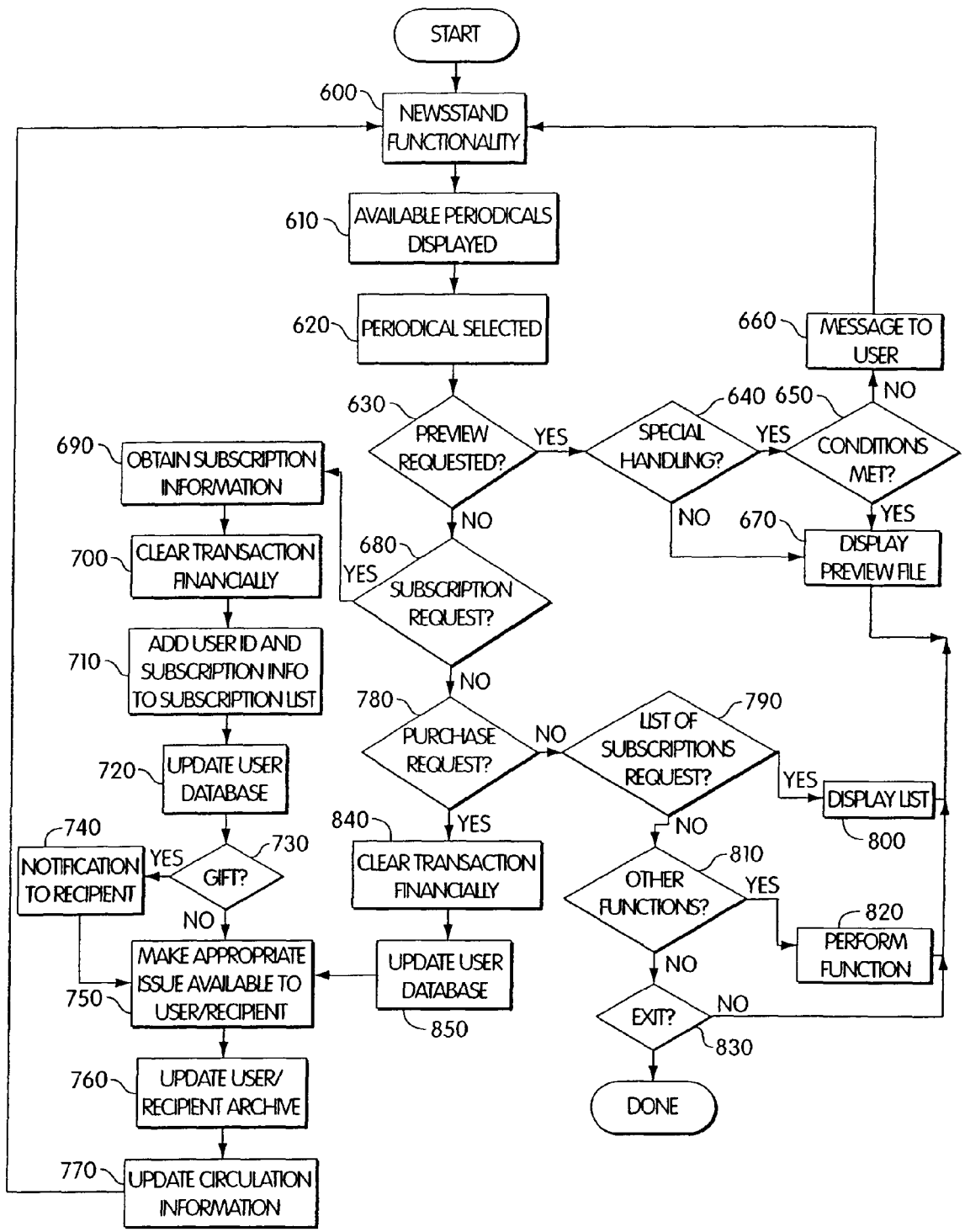
FIG. 8 is a flow chart illustrating a method for obtaining electronic documents to be read, in accordance with one embodiment of the invention.

FIG. 8 is a flow chart illustrating a method for obtaining electronic documents to be read, in accordance with one embodiment of the invention. In FIG. 8, the process for obtaining documents begins with the newsstand of the reader 78 (step 600) or with the equivalent location on the entity interacting with the system 50, as described above. For example, in one embodiment, to subscribe to a magazine, the user goes online and enters the newsstand in the reader 78

(step 600). Of course, the user can enter the newsstand and then go online, or the reader 78 can make the online connection when the user enters.

The magazine encryption and distribution service 60 service displays magazines that are available (step 610) and waits for the user to make a selection (step 620). In at least one embodiment, the magazines are displayed using hyptertext markup language (HTML), such as by using metadata found in the ZDF file. In some embodiments, the display may include featured magazines for the newsstand for that day/week/month, magazines organized into categories, featured magazines in a category, alphabetical listings of magazines, and the like.

In at least one embodiment of the invention, each magazine is displayed on the newsstand pages in the form of a cover thumbnail above several buttons enabling the user to select an option associated with that document. For example, there may be a button for purchasing a single copy, another to purchase a subscription, and another to see a preview of the magazine. The user can select (step 620) the desired periodical by selecting a button associated with the periodical.

If the user requests a subscription (steps 630 and 680), the system 50 initiates a subscription transaction. During the transaction, the system 50 obtains information necessary to make the magazine subscribed to available to the user (steps 690 and 700). For example, in at least one embodiment of the invention, the following information is obtained.

Term of subscription
    Start of subscription (current issue, next issue, or future issue)
    Postal address
    Email address
    Payment information
        Possible use of a group account, which ultimately resolves back to a credit card.
        Card number from user's/group's stored profile.
        Option to add to profile.
    If gift subscription, user Login of recipient If a payment is required for the subscription, the system 50 clears the transaction financially (step 710). In at least one embodiment, the magazine encryption and distribution service 60 manages the entire subscription transaction, which is recorded in the circulation database (step 710), along with the subscription list for each magazine title. In addition, when the transaction is cleared (step 700), the magazine encryption and distribution service 60 encryption and distribution service 60 adds the userID to the subscription list associated with the ordered title along with the expiration date/issue for that user. If, for example, the order is a group purchase, all of the members of that group have their userIDs' added to the subscription list and their records in the user database updated to reflect the subscription. The magazine encryption and distribution service 60 also updates the user's record (step 720) in the user database with the relevant information, such as magazine title, expiration date/issue, and credit card or group number used for the transaction (in case the subscription is cancelled later). In at least one embodiment, the credit card number is stored in an encrypted form.

After the transaction is cleared financially, the subscription is confirmed and if it starts with the current issue, the magazine file is encrypted and downloaded to the user's reader 78 (step 750) or is saved for later downloading, possibly to another reader 78. The user's archive list on the reader 78 also is updated with the IssueID of the magazine that was just delivered.

For gift subscriptions (step 730), the process is similar to the process described above, except that a notification, such as an email (step 740) is sent to the recipient, notifying the recipient of the gift. If the subscription starts with the current issue, a link to download the issue will also be included. When the recipient picks up the first issue of the subscription, the gift sender is notified.

Other features, such as customizable thank you emails, reciprocal agreements (if you let me share your magazine you can share mine), discounts for frequent subscriptions, emails alerting of special offers, and the like, also may be part of the communications offered to subscribers of magazines, gift recipients, and even purchasers of single issues.

One of the advantages of having a digital delivery system, as described in some embodiments of the invention, is that modifications to account information can be handled quickly. Referring to FIG. 8, these modifications can be done if a user selects "other functions" (steps 810 and 820). Some of the modifications anticipated include the following:

Change of addresses (postal and/or email)
    Subscription cancellations
    Subscription renewals The system 50, in at least one embodiment, handles at least a portion of the modifications using HTML forms and scripts. For example, changes of addresses are reflected in updated user profiles in the user database. Subscription cancellations are implemented by displaying the list of titles the user subscribes to along with the expiration date/issue and having the user select the title to be canceled. When a title is selected, the user's userID is removed from the subscription list, the user's record in the user database is updated, and a credit is sent to the user's credit card account according to the publisher's defined rules for credit.

Subscription renewals are handled in the same way as subscription orders, except the starting issue and credit card numbers are automatically filled in based on the current subscription. The user can, of course, change and/or update the information. In some embodiments, the system 50 provides alerts of subscriptions running out. For example, to make a user aware that his subscription is about to run out, 2 issues prior to the last issue, the subscription check (which can be performed by any of the services in the system 50, such as the circulation service 62 and/or the magazine encryption and distribution service 60 brings up a reminder that "you have two issues left" and give the user a button to click to renew. The reminder is generated by the magazine encryption and distribution service 60 based on the expiration date/issue stored in the user's record for that title. The reminder is updated for the next to last issue to read "you have one issue left". The message for the last issue is "this is your last issue." Pressing the subscription renewal button will bring up the subscription renewal version of placing a subscription order.

In some embodiments of the invention, the magazine encryption and distribution service automatically renews the subscription for the user, if the user selects this option. The user may or may not elect to be warned before the automatic renewal occurs. For this option, a record is kept that they did select automatic renewal for audit purposes, along with any notices and acknowledgements related to the renewal.

When a magazine issue is released, the magazine encryption and distribution service 60 goes through the subscriber list (stored in the circulation database 64) for the title and updates the pickup list in the users database 66 for each of the userID's. When the user opens the reader 78 while online, the reader 78 checks with the magazine encryption and distribution service 60 to see if a magazine is available. The magazine encryption and distribution service 60 determines whether or not an issue is available by looking at the user's pickup list in the user database 66. If one or more issues are available for pickup, the reader 78 notifies the user and asks if the user if he wants to download the issues. If the user declines, the issues are left on the pickup list for the next subscription check. If the user accepts, the issues are downloaded to an archive area of the reader 78 (which in one embodiment is called the "My Collection" area), and the users database 66 is updated by cleaning up the pickup list and adding the IssueID and key to the user's list of archived issues. The circulation database 64 is also updated to reflect the delivery of a copy of the issue. In one embodiment, an email is generated to notify the user of a new issue if the user selects that option.

The magazine encryption and distribution service 60 handles the commercial transaction to purchase the subscription or single copy, then retrieves the ZDF file from the magazine data store 58 and encrypts it for use by the user (step 750). The user's data in the user database 66 is updated with the issue identifier and the encryption key for that file download (step 760). Records are generated in the pass along database 70 and/or the magazine usage database 72 to allow pass-along and archival retrieval (step 760). In one embodiment, each subscription request, payment transaction and file download are recorded for audit purposes and to generate billing invoices.

For subscriptions, after the subscription request has been filled out and confirmed, the circulation database 64 is updated with the subscription request (step 770). For subscriptions and single copy purchases, after the payment has been processed, the circulation database 64 is updated with the commercial transaction (step 770). After the file has been downloaded, the circulation database 64 is updated again with the note that delivery has been completed. Referring again to FIG. 2 and FIG. 8, in at least one embodiment of the invention, content can be obtained on a non-subscription basis, as well. For example, content can be purchased from the newsstand (steps 780, 840, 850, and 750 through 770). Content also may be purchased from a third-party retailer, via the retail transaction service 76. Purchasing a single-copy is, in one embodiment, similar to a subscription purchase. One difference is that with purchase of a single copy, only the payment information is required from the user (step 840), similar to the purchase of a single copy in a conventional newsstand. After the transaction for purchasing a single copy is cleared financially (step 840), the magazine file is encrypted and downloaded to the user's reader 78, updating the user's archive list on the reader with the IssueID of the magazine that was just delivered. In at least one embodiment, the magazine is downloaded to a user's reading device (e.g., computer) and is stored there. The magazine encryption and distribution service 60 manages the entire purchase transaction, which is recorded in the circulation database.

If the purchase was for a group purchase, all of the members of that group have the issue added to their pickup list as if it was a subscription issue. The next subscription check by the other members will prompt them to download the magazine. The newsstand accessible via the reader 78 can, in one embodiment, be set up to "market" the content. For example, the newsstand can be constructed and arranged to include placement slots, and the various "pages" of the newsstand are organized to feature selected magazines based on categories. In at least one embodiment of the invention, selected magazines are promoted based on the user's expressed interest as stored in the user's profile on the users database 66.

In at least one embodiment, content such as magazines is displayed on the newsstand using compact versions of the magazine image (such as cover "thumbnails" images) above functional buttons such as subscribe and purchase buttons. In the conventional paper world, a user may preview the magazine before purchasing. In the newsstand of the invention, clicking on a cover thumbnail (step 630) causes the magazine's preview file, if available, to be downloaded to the user (steps 640, 650, and 670). The preview file is not encrypted to the user unless it contains adult content, in which case it will be keyed to the user (to allow for situations such as when a person other than the user is using a user's computer or other device to run a reader 78 and view the magazine previews). If a preview file requires some type of special conditions to be met (steps 640 and 650), such as a minimum age requirement, the system 50 checks for that condition. If it is not met, the system will notify the user (step 660) and will not display the preview to the user.

The preview file, in one embodiment, is a small excerpt of the magazine as defined by the publisher. For example, a preview file for a magazine can include the cover, the table of contents, and possibly the first few pages of the lead article. In at least one embodiment of the invention, the reader 78 cannot archive preview files.

After previewing the magazine, the user may purchase and/or subscribe to the magazine, in the same manner as described previously. In one embodiment, to facilitate this, the preview file includes a link that takes the user into the purchase or subscribe transaction process in the newsstand. Of course, it is not necessary to preview a magazine before purchasing or subscribing.

In one embodiment of the invention, the system 50 provides for predetermined error conditions. For example, there is the possibility that after an issue has been delivered, the payment may be rescinded. For that condition, the system 50 prevents access to a particular issue, such as by removing the issue from the list of "purchased" issues. On the reader 78 (client) side, the reader deletes the local client copy, and can notify the user prior to the deletion.

As noted previously, another way to obtain non-subscription content is from a third party retailer or retail transaction service 76, such as AMAZON.COM or BARNESAND-NOBLE.COM. In at least one embodiment of the invention, marketing of the content (e.g., "featuring" particular issues, the way issues are organized and presented, etc.) is at the discretion of the retailer. The system 50 can, if desired, provide the retail transaction service 76 with magazine previews that link back to the retail transaction service 76 for fulfillment should the user decide to purchase a single-copy. In one embodiment, subscription links link back to the magazine encryption and distribution service 60 of the system 50.

Figure 11:
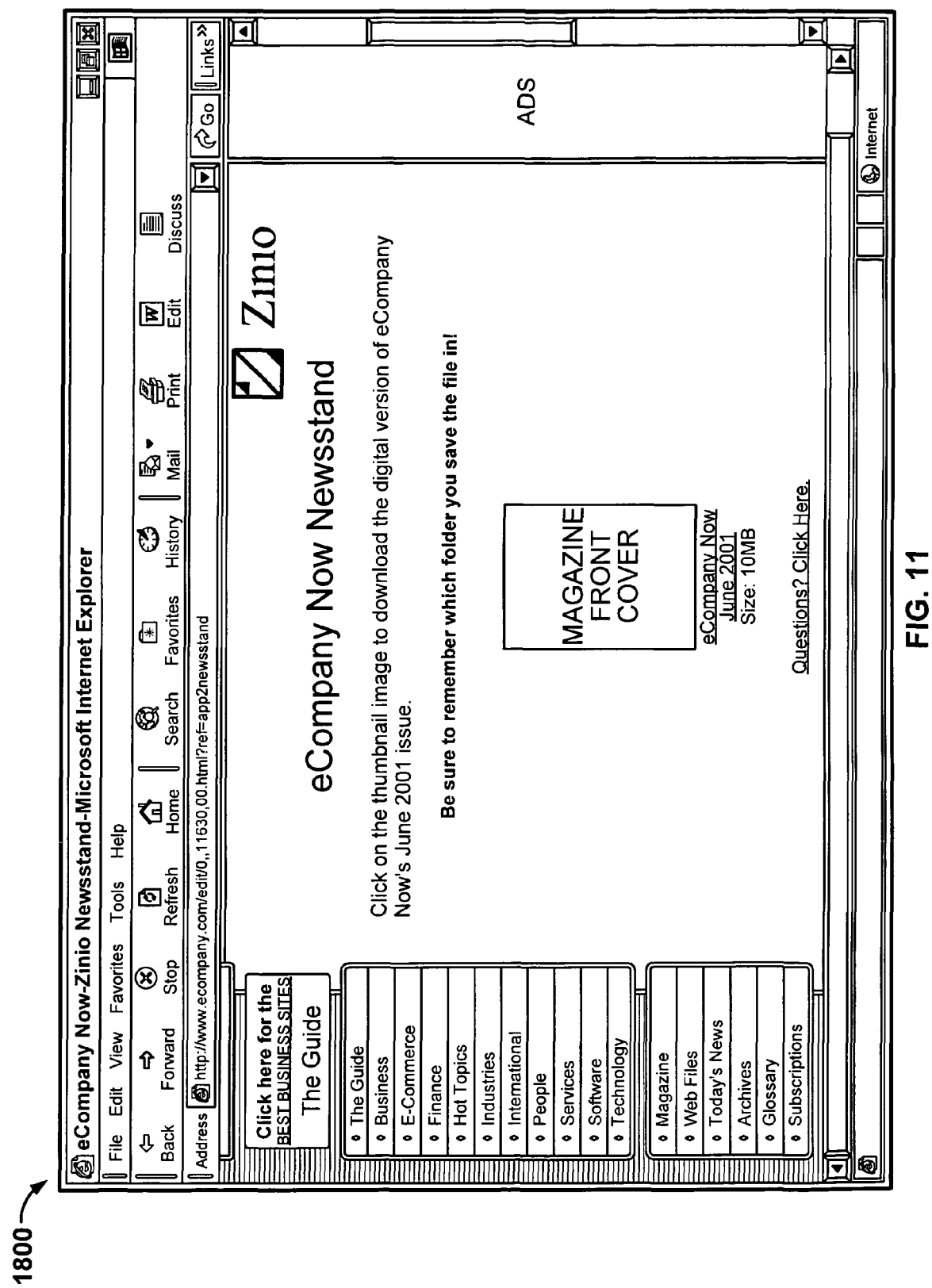
FIG. 11 is a screen shot depicting an example third party screen for downloading an electronic magazine, in accordance with an embodiment of the invention.
Figure 12:
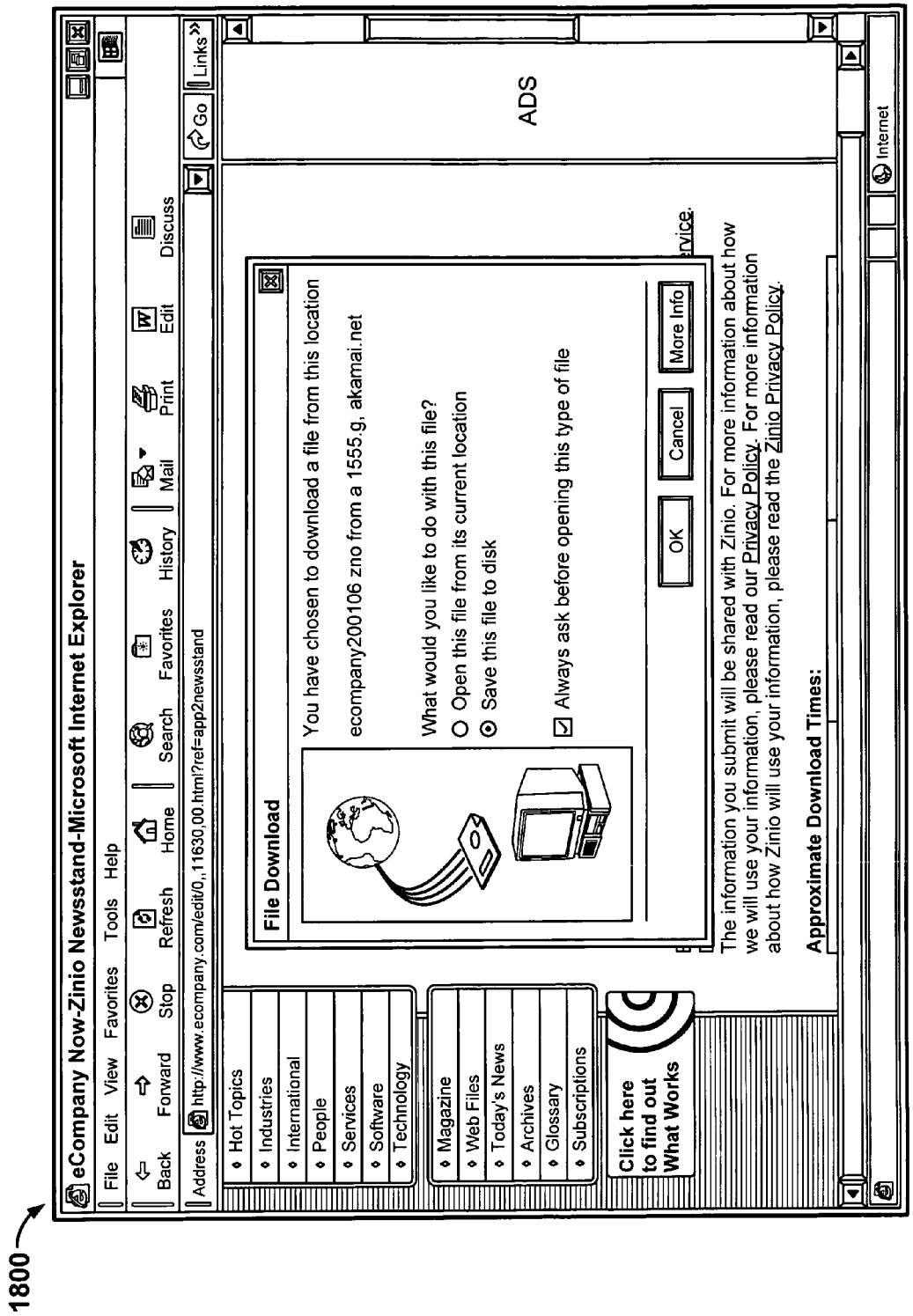
FIG. 12 is a screen shot depicting an example depicting the download screen for the third party screen of FIG. 11, in accordance with an embodiment of the invention.

Getting a magazine from a third party retailer or a retail transaction service 76 is similar to the Newsstand scenario except that the retailer handles all of the financial aspects of the transaction prior to contacting the magazine encryption and distribution service 60. However, the retail transaction service 76 provides the purchase price and payment confirmation so that the data can be recorded in the circulation database 64 for circulation auditing purposes. FIG. 11 is a screen shot depicting an example third party screen 1800 for downloading an electronic magazine, in accordance with an embodiment of the invention, and FIG. 12 is a screen shot depicting an example depicting the download screen 1810 for the third party screen of FIG. 11, in accordance with an embodiment of the invention;

A retail transaction with a retail transaction service 76 begins when the user selects a magazine for purchase. The retail transaction service 76 gets the user's system 50 login and password so that the user can be verified as a user of the system 50. Once the system 50 has validated the user, the retail transaction service 76 handles the financial transaction and provides the payment price and confirmation when the transaction clears. Failed transactions are managed by the retail transaction service 76.

The issue file is encrypted for the user and sent to the retail transaction service 76 for delivery to the end user. The circulation database 64 and the user's archive list in the user database 66 are updated as necessary. The retail transaction service 76 is also responsible for notifying the system 50 when the delivery has been completed.

In one embodiment of the invention, as an alternative to the retail transaction service 76 handling the actual delivery, the retail transaction service 76 is provided with a link to the magazine encryption and distribution service 60 so that the user downloads the file from the system 50. With that method, the system 50 has confirmation of delivery. If desired, the system 50 can notify the retail transaction service 76 of the delivery for their records. The system 50 can also, if necessary, settle accounts with the publisher.

Figure 14:
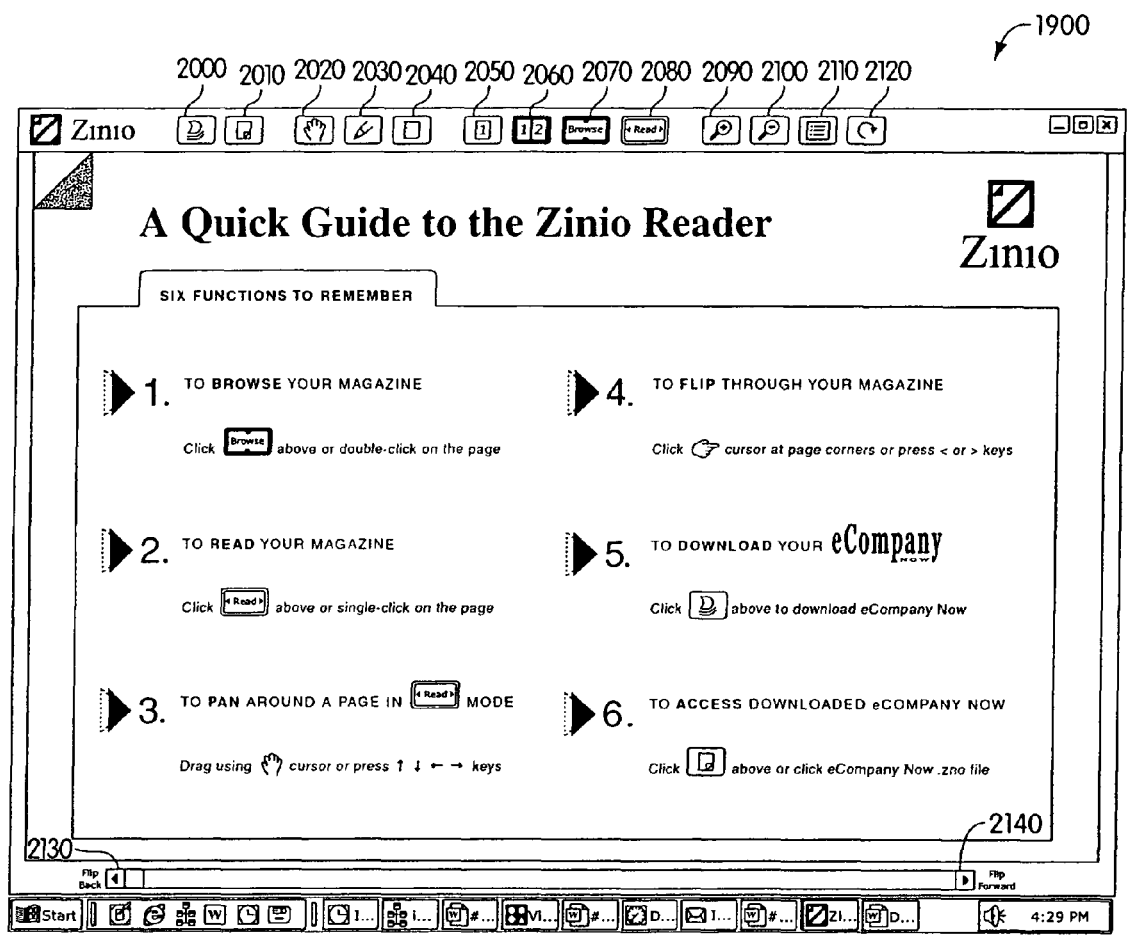
FIG. 14 is a screen shot depicting the features available using a system implemented in accordance with an embodiment of the invention.

After the magazine file (which is referred to as a "ZNO" file in the embodiment of the system 50 shown in FIG. 2) has been added to the user's reader 78, the user can read the file. For example, in one embodiment, the magazine file is stored as a thumbnail image in an area of the reader 78 called the "My Collection area," and can be read by opening the reader 78 and clicking on the cover thumbnail in the My Collection area. In at least one embodiment, if a user locates the magazine file on her computer (e.g., if the file is started as part of the computer file structure) and clicks on it, the reader 78 is launched automatically, as with many other types of files and applications. FIG. 14 is a screen shot depicting a representative example of a screen on the reader 78 showing the features available, in accordance with an embodiment of the invention.

Referring briefly to FIG. 14, one of the embodiments of the reader 78 provides features (accessible via onscreen "buttons", such as download 2000, a "My Collection" area 2010, a dragging/panning feature 2020 for use when reading a document, a highlighting feature 2030, a tear out feature 2040, a single page mode 2050, a double page mode 2060, a browsing mode 2070, a reading mode 2080, zoom-in 2090, zoom-out 2100, options/preferences 2110, rotate screen 2120, flip back 2130, and flip forward 2140.

The download 2000 feature provides a quick link to the newsstand functionality. The "My Collection" 2010 feature access to local files that contain the print layout version of the desired content. The dragging/panning feature 2020 provides drag and panning of the display screen to provide visibility to other portions of the page. In at least one embodiment, the dragging/panning feature 2020 is accomplished by pressing down on the mouse button at a point on the page, moving the mouse in the desired direction and releasing the button. The display can be updated after the button is released, or while the button is depressed. Updating after the button is released will cause a "snapping" effect as the page is repositioned. The highlighting feature 2030 provides the ability to highlight, annotate, "dog-ear", and/or mark the content. The tear-out feature 2040 provides a page-clipping function, enabling a user to "remove" articles from the magazine, if the associated rights permit it, and retain the article for the user's own user, pass it along to another, incorporate it into another document, etc., as required and permitted. It should be noted that because some embodiments of the invention provide digital rights management at the object (e.g., picture, article, etc.) level, the reader 78 could handle functions such as the tear-out feature 2040.

Figure 15:
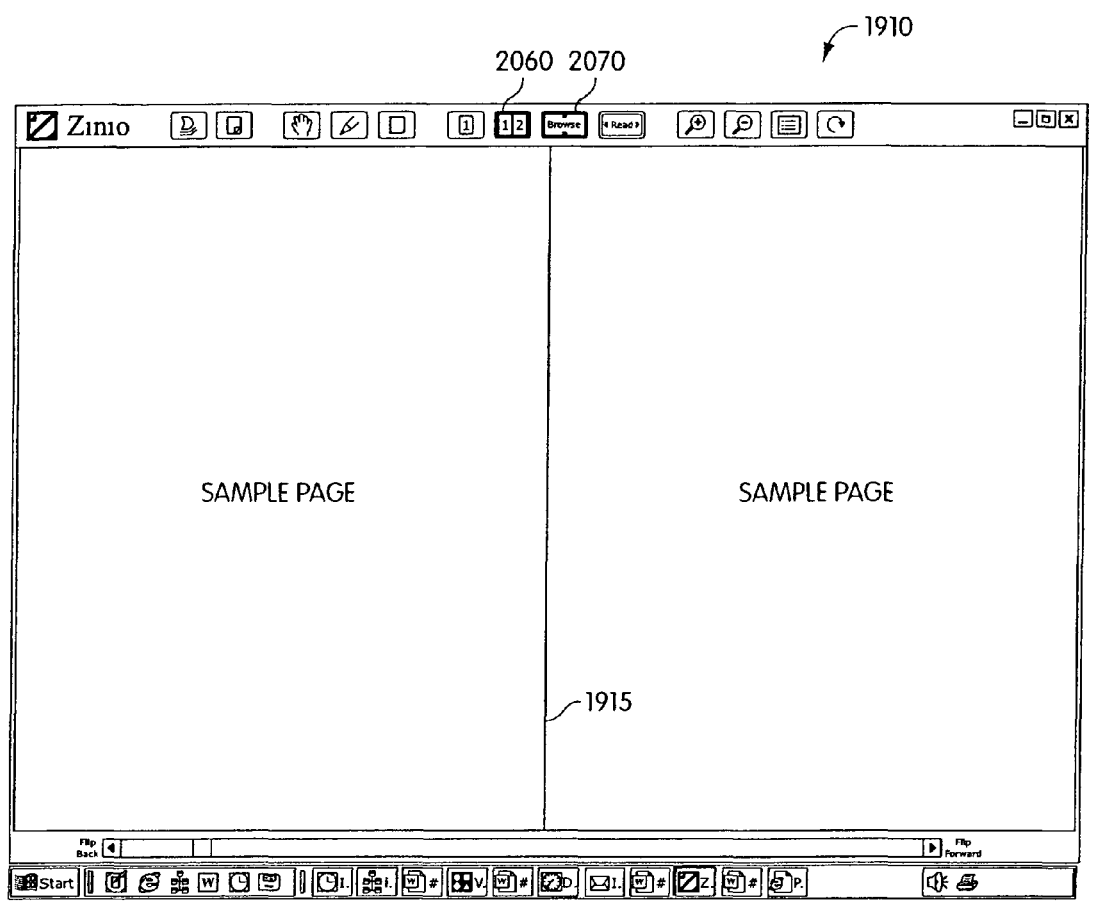
FIG. 15 is a screen shot depicting a two-page browsing layout of the electronic magazine of FIG. 13, in accordance with an embodiment of the invention.
Figure 17:
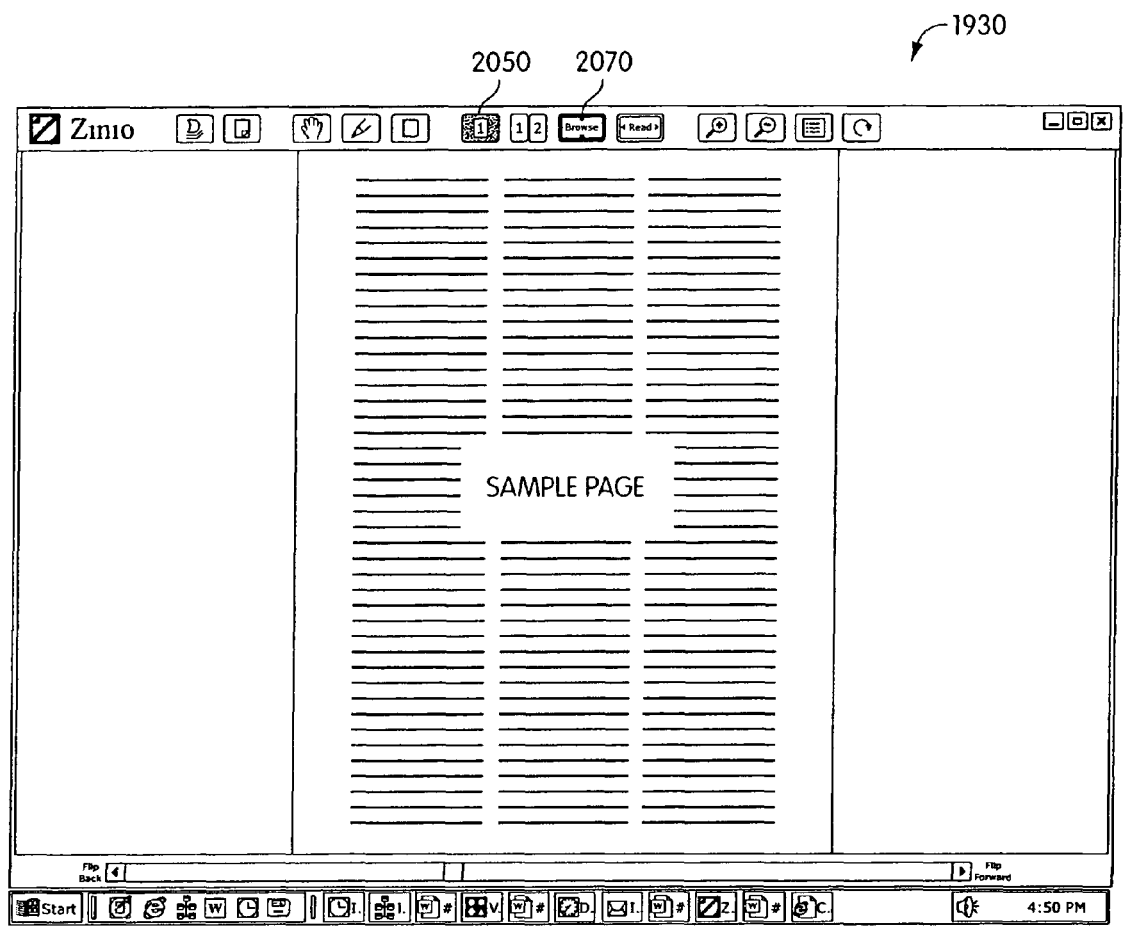
FIG. 17 is a screen shot depicting a single page browsing layout of the electronic magazine of FIG. 13, in accordance with an embodiment of the invention.

The single page mode 2050 and double page mode 2060 permit the user to view the magazine in the desired one or two-page format. The browsing mode 2070 permits the user to browse the magazine quickly and, in one embodiment, browsing mode 2070 defaults to a double page mode 2060. FIG. 15 is a screen shot depicting a two-page browsing layout 1910 of a representative electronic magazine, as viewed using the reader 78, in accordance with an embodiment of the invention. It also is possible to browse a magazine in a single page format. FIG. 17 is a screen shot depicting a single page browsing layout 1930 of a representative electronic magazine, in accordance with an embodiment of the invention.

The read mode 2080 permits the user to read content on a given page. In at least one embodiment, the read mode 2080 displays the content in a single page mode 2050, in a size "zoomed in" enough for the average person to read the magazine off of the screen. It also is possible, of course, to show two pages while reading content, to take advantage of the seamless two page spread display and navigation of at least one embodiment of the invention. While in two page mode, the user can take advantage of the read mode animation of the invention to zoom in to a portion of the magazine article to read a particular detail, such as by using the pan/drag feature 2020 to quickly and easily focus in on content.

Figure 16:
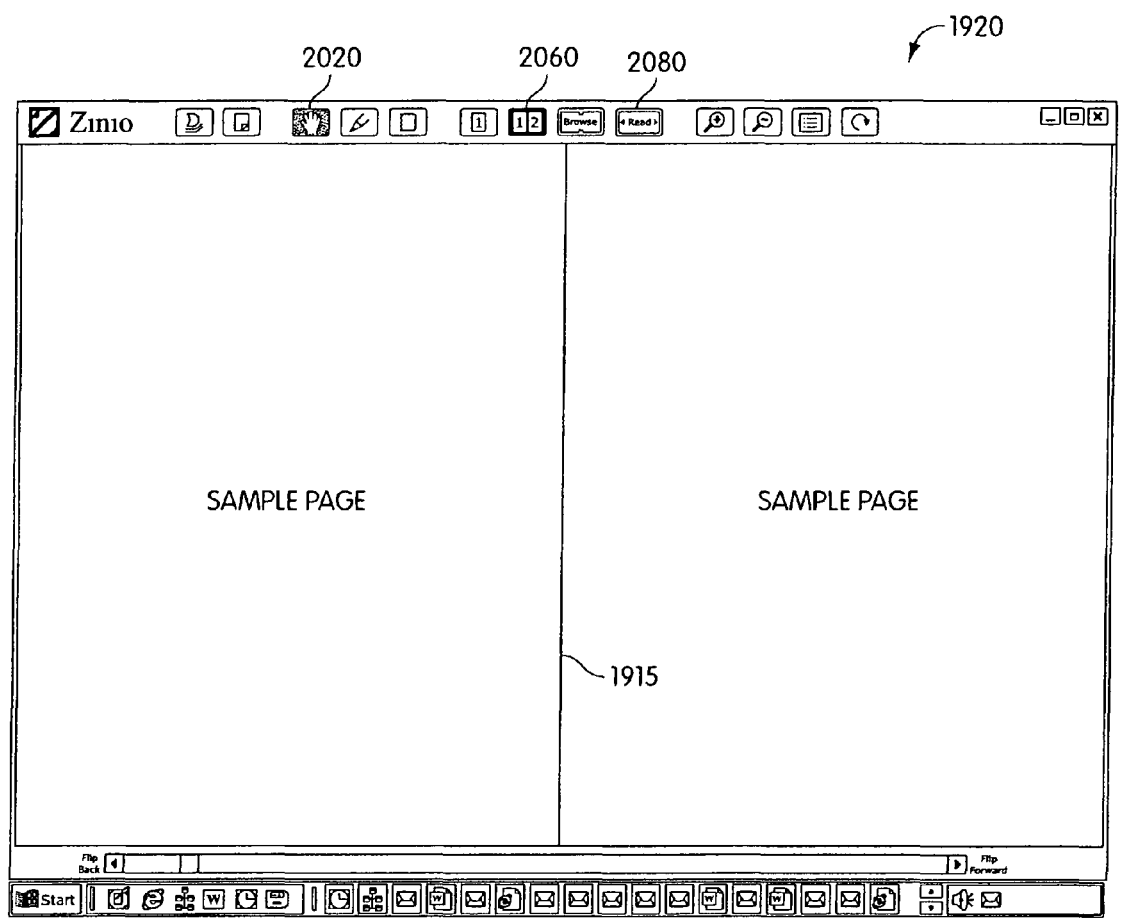
FIG. 16 is a screen shot depicting a two page reading layout of the electronic magazine of FIG. 13, in accordance with an embodiment of the invention.

FIG. 16 is an example screen shot 1920 depicting a two page reading layout of a representative electronic magazine, showing that the pan/drag feature is enabled, and the user has "zoomed in" on the content of interest from the two-page browse layout of FIG. 15. Note, in particular, that the reading layout, in accordance with an embodiment of the invention, is able to pan/drag across the "gutter" 1915 of the depicted magazine and can zoom in on it. In going from the screen of FIG. 15 to the screen of FIG. 16, the user clicks on the point of interest on the page, thereby activating the pan/drag feature 2020 so that the user can use a pointing device to move the page to the desired areas of the page. For example, in two-page mode, the two pages are treated as a single page, allowing the user to read information on both sides of the "fold", "spine", center portion, gutter 1915, and the like, of the magazine. This action can be very intuitive and similar to a user's bringing a conventional magazine closer for reading part of a page and shifting focus to other parts of the page.

The zoom in feature 2090 and zoom out feature 2100 work in a manner similar to convention zoom in and zoom out features in other software packages. In one embodiment, the zoom factor is fixed for the different reading modes (e.g., browse and/or read). In one embodiment, the user controls the zoom factor. In at least one embodiment, the zoom in and zoom out features 2090, 2100, respectively, work with a so-called "magnifying glass" approach, where a separate window is moved across the page and the content of the window is an enlarged version of the page under the window. With this approach, the user can control the amount of enlargement in the window. The shape of the window also can be adjusted to fit the material being enlarged, e.g., seeing the entire width of a column. In another embodiment, the zoom in and zoom out features 2090, 2100, respectively, change the enlargement of the page in the original page window.

Figure 9:
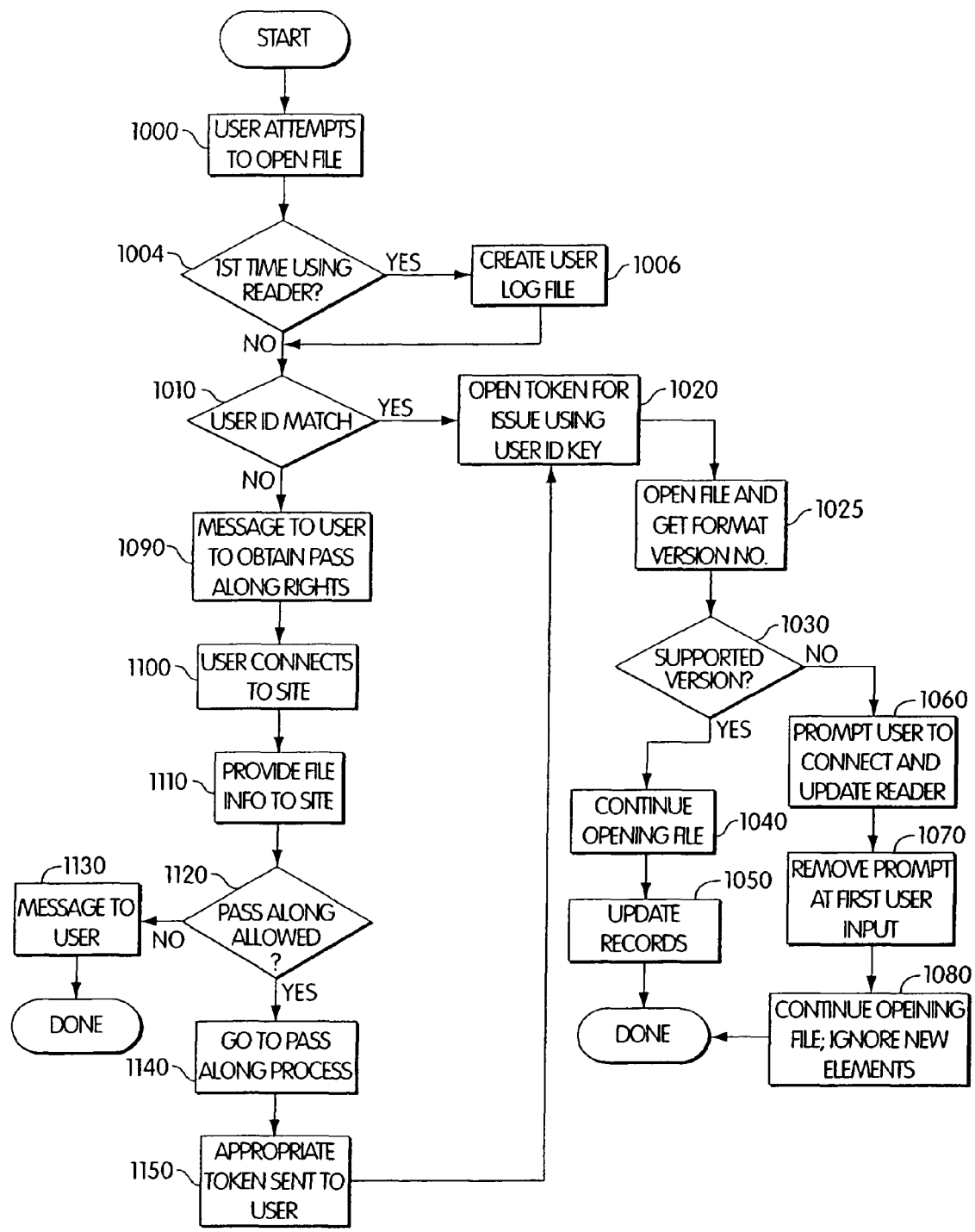
FIG. 9 is a flow chart illustrating a method for accessing an electronic document to be read, in accordance with one embodiment of the invention.

FIG. 9 is a flow chart illustrating a method for accessing an electronic document to be read, in accordance with one embodiment of the invention. Referring to FIG. 2 and FIG. 9, when a magazine file (e.g., a ZNO file) is opened for reading (step 1000), if it is the user's first time using the reader with that magazine file (step 1004), the reader 78 creates a file to record the user's keys for the magazine on that reader 78 (step 1006). The reader 78 also checks to determine whether the userID for the user matches the userID(s) that are allowed for the magazine (step 1010). If the userID is a match, the key token for that issue is opened with the userID key (step 1020).

In at least one embodiment, the userID key is kept locally. The issue key in the key token is then used to decrypt the magazine file. Also in the key token is information that determines if the user has full access or limited access.

In some embodiments of the invention, instead of storing the tokens in a separate file, the reader 78 stores the tokens in a data structure on the client device (e.g., on the computer, EBOOK, PDA, etc.). In at least one embodiment, the tokens are stored in a portable manner (e.g., on a disk, "smart card," badge, or other physical token) on a physical element capable of being read to provide the tokens. Depending on the number of issues that the user obtains, either directly or via pass-along, this could grow to a very large file.

In at least one embodiment of the invention, to avoid encryption at the reader 78, the system 50 of the invention uses tokens. In one embodiment, however, the data structure is encrypted, which may help prevent decoding of the token and the rights structure.

When the user opens the issue of the magazine, the reader 78 opens the file and gets the format and version number of the ZNO file (step 1025). File checking, in one embodiment, occurs completely within the reader 78, so no interaction with the update service 67 is required. As noted previously, in some embodiments, to simplify file format checking, if a reader 78 supports a given file format version then the reader 78 will support all file format versions prior to the supported version. However, if the format or the version number are not supported by the reader 78 (step 1030) (such as, for example, when the version number of the file is greater than the supported version number), the user is prompted to connect and update the reader (step 1060), using, for example, the method shown in FIG. 7. If the update does not occur, the prompt is removed at first input by the user (step 1070), and the file continues to be opened, with the reader 78 ignoring unsupported and/or new elements (step 1080).

Figure 13:
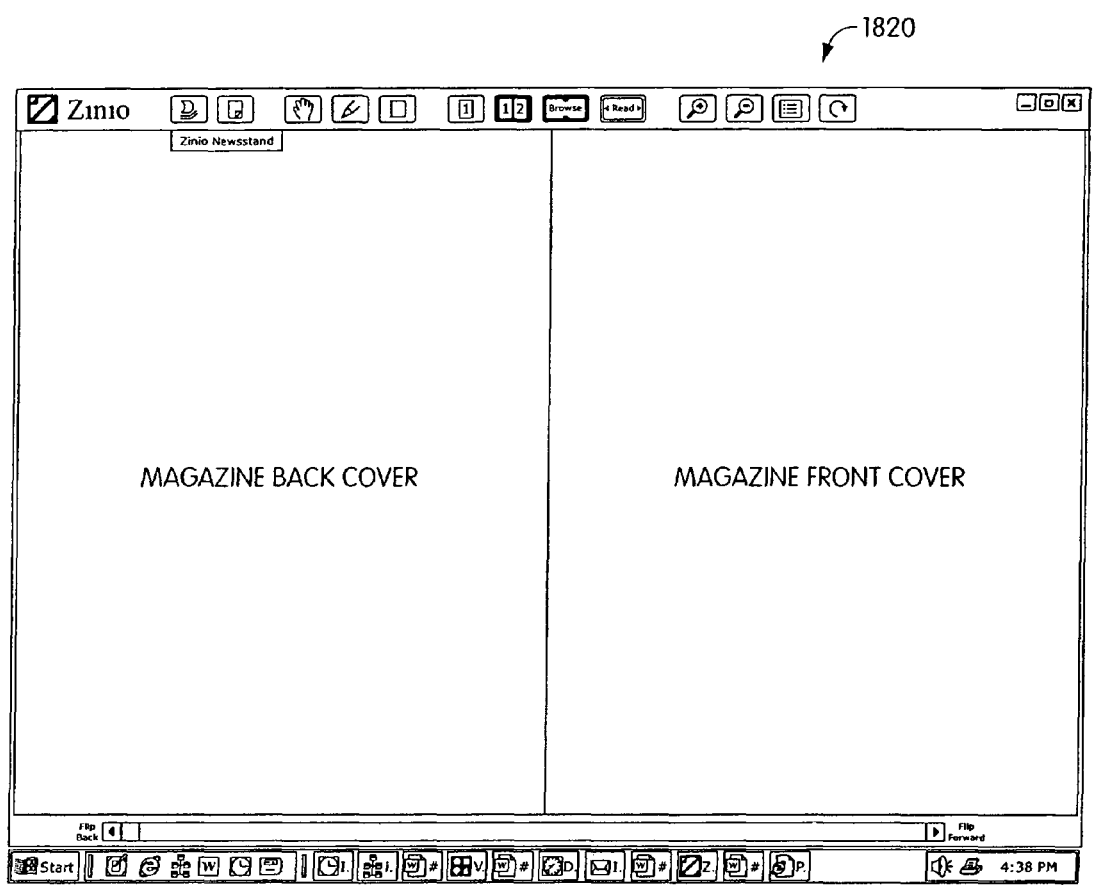
FIG. 13 is a screen shot depicting an example of an electronic magazine downloaded for reading, in accordance with an embodiment of the invention.

Referring again to FIGS. 2 and 9, if the version number is supported (step 1030), the reader 78 continues opening the file (step 1040) so that the user can read it. FIG. 13 is a screen shot 1820 depicting an example of an electronic magazine, called by way of example only "eCompany," downloaded for reading to the reader 78, in accordance with an embodiment of the invention. As the user reads the magazine, usage data is kept in the usage log. (step 1050), which is explained more fully herein. In addition, in at least one embodiment, the reader 78 can record other information and/or actions that a user of the reader 78 requires. For example, the reader 78 supports actions (e.g., steps 84 through 94 of FIG. 3) that a user can perform while reading and/or browsing the magazine. When the user adds annotations to a magazine, for example (step 86 of FIG. 3), the reader stores the annotations are stored in an annotations file (step 1050 of FIG. 9), one for each issue. As each annotation is added or deleted, the annotation file is updated to reflect the changes. Thus, if the device running the reader 78 crashes or if other problems occur, the annotations are not lost. Annotation can be stored, in one embodiment in the original ZNO file.

In at least one embodiment, a user of the reader 78 can peruse the magazine "offline," so no interaction with the system 50 is required to read a magazine once the key token, either pass-along or direct, is received.

In at least one embodiment of the invention, the data format of the magazine file allows the reader 78 to display and link documents. For example, the reader 78 uses the rendering engine built into the reader 78 to convert the ZNO descriptions into visual representations of the pages. In addition, the reader 78 has the ability to determine links that have been embedded in the ZNO document. The internal or external resource pointed to by the link is, in one embodiment, handled by the proprietary portion of the reader 78.

Creating the links occurs at the pre-press stage of the conversion process. Initially, an application such as ADOBE ACROBAT is used to manually create the links. In some embodiments of the invention, however, the system 50 uses a more automated process. Depending on the goals of the advertiser or publisher, in at least one embodiment, the reader 78 can incorporate video and/or audio to an advertisement, catalog, or article. In some embodiments, the balancing factor is the size of the resulting file that is to be downloaded.

In one embodiment, the reader 78 supports three types of annotations: text notes, bookmarks and highlights. In some embodiments, the reader 78 supports handwritten notes when the reader 78 includes (or is used with) interfaces that support handwriting on laptops, desktops, PDAs, or other devices. For text notes, a text box is created that is anchored to a selected point on the page. Text box functionality that is supported includes entering text using the keyboard, resizing the size of the box, and moving the cursor position to allow editing data entry is complete when they click the close icon, at which point the text box data is stored in the annotations file associated with the magazine and the border of the note is modified to indicate that the box has been stored.

For bookmarks, the page number, type of bookmark and anchor point are recorded in the annotation file.

For highlighting, the reader 78, in one embodiment, uses the ADOBE ACROBAT library feature for highlighting of text. In one embodiment, the reader 78 uses page coordinates to identify the start and stop points of the highlighted text lines and records them in the annotations file that is linked to the magazine.

Annotations also can be modified and/or deleted. Selecting the particular annotation on the page brings up the appropriate tool to modify the annotation. In addition, for text notes, the tool permits the user to edit the note. For bookmarks, the tool allows the user to change the type of bookmark. For highlights, the tool allows the user to change the start and/or end point of the highlight. Selecting any annotation also allows the user to delete the annotation by using a predetermined key, such as the Delete or Backspace key.

Another document reading feature provided in some embodiments of the invention is synchronizing. For example, if the user subscribes to the expanded services, the annotations file on the reader 78 is synchronized with one or more databases at the system 50. This can be done upon the occurrence of any one or more predetermined conditions, such as when the newsstand is accessed or when the file is deleted from the archive of the reader 78.

Still another document reading feature provided in at least one embodiment of the invention is searching. In one embodiment, the reader 78 provides full text searching of documents. In one embodiment, the reader 78 generates an index based on the index structures of the files. For example, the reader 78 can generate an index sorting files it has based on date and/or topic, so that a user can perform a structured search of his documents for all articles within a given date range that relate to a given topic.

In some embodiments, the invention implements searches in a variety of ways that can differ from and/or go beyond searching such as intra-file full-text search in Phase 1. For example, in at least one embodiment, one unique feature of the ZNO files is that the collection of ZNO files can be dynamic. The user can remove and add ZNO files at will in the file structure associated with the operating system of the device on which the reader 78 is implemented. In one embodiment, the reader 78 assumes a root folder from which the search for ZNO files start. All ZNO files "below" the root are considered when conducting a search.

One of the components in a ZNO file, in an embodiment of the invention, is a search index that has been created based on the contents of the file. When the reader 78 conducts an inter-file search, the indices are used to quickly locate the page references. A separate index is included in each file so that a comprehensive index of all available files need not be created each time a search is initiated. In a comprehensive index, each addition and deletion from the local magazine collection is managed. In some embodiments, this may be difficult to do given that file management is an operating system function.

Searching across files on the system 50 can be simpler because a comprehensive system index is possible, because ZNO files are not deleted easily from the system 50. In at least one embodiment, the system 50 uses a third party searching system to perform searching.

When sharing content (the page tear function; see step 84 of FIG. 3), the elements of the pages are reassembled into a general use ZNO file that contains the elements that have been approved for sharing. Though it is general use, the creator of the excerpted file is set as the purchaser of original issue from which the excerpt was taken. A dialog box asks the user if annotations are to be included in the file. If annotations are included, they are added to the file instead of being sent in a separate file.

In at least one embodiment, the reader 78 permits the user to engage in commerce-type functions, such as perusing and ordering from catalogs, ordering directly from advertisements in magazines, and the like. Referring to FIG. 2, this is accomplished, for example, using the commerce service 61. The commerce service 61, in conjunction with the reader 78, provides a consistent user interface to users of the reader 78 and promotes commerce via catalogs. During the entire transaction cycle (queries, order, settlement, delivery and possible return), the commerce service 61 acts as the agent of the reader 78 by translating the user's desire via the consistent user interface into the varying requirements of the various retailers, like, a "wizard" for catalog commerce transactions.

In at least one embodiment of the invention, the commerce service 61 simplifies the process of ordering (to promote commerce transactions), by providing features such as:
  Pre-filled in forms
  Automatic status checking of orders
  Rationalized return procedure
  Rationalized retailer contact info
  Creation of gift/wish lists across retailers For merchants, such as 3rd party retailers 77 and catalog ordering systems 79, 79', the commerce service 61 provides features such as:
  Enforcing privacy with respect to amount and type of information exchanged
  Translating retailer specific requirements into a consistent user interface for users to make purchasing and returns easier
  Aggregating transaction data, including demographics In accordance with at least one embodiment of the invention, to conduct a commerce transaction using the system 50 and the reader 78, various steps and information are exchanged. An example of the commerce transaction process includes steps such as:
  Preparing the catalog
  Establishing the Commerce Transaction Interfaces (CTI)
  Transaction Processing
  Transaction Summaries for retailers
  Transaction Summaries for users Preparing the catalog involves creating the catalog of products that will be distributed in the ZNO file format. During the course of generating the file, various data elements necessary to identify and purchase a particular item are gathered and incorporated into the transaction database 73 that is then used to generate the various catalog pages.

The transaction database 73 is necessary, in at least one embodiment, because it is also used by the commerce service 61 when communicating with the catalog order systems 79, 79' to place and check orders.

There are various policies and procedures that are particular to each retailer. The Commerce Transaction Interface (CTI) (not shown in FIG. 2) captures the various possible transactions that can occur between the commerce service 61, and maps them to the consistent user interface associated with the system 50 and/or the reader 78.

As an example, some of the policies and procedures can include:
  Privacy policy on information sharing
  Returned merchandise policies and procedures
  Billing procedures
  Shipment tracking procedures
  Order status procedures
  Affinity program procedures While the user interface is consistent, the system 50 provides opportunities for the retailer to brand the interface so that the user knows with whom the order is being placed.

Commerce transactions are initiated when a user opens a catalog and interacts with the elements on the pages. Examples of the possible types of transactions include:
  Query for Product information
  Order management: placing, canceling, and monitoring
  Affinity program management
  Gift list management Depending on the information requested, the user may or may not need to be online. If the information was included in the ZNO catalog, such as available sizes and colors, the information is, in one embodiment, displayed without accessing the system 50. Current information, such as quantity in stock, however, may require a connection to the system 50, the Internet, or another computer network.

The query is started when the user interacts with the query elements on the catalog page that is associated with a product. Depending on the type of information desired, the reader 78 either displays the information or queries for a connection to obtain the necessary information. If a connection is not available, the user is notified and asked if she would like to automatically resend the query when a connection becomes available.

If an online query is required, the reader 78 sends the query to the commerce service 61, which translates and routes the query to the relevant catalog order system 79, 79'. Responses to the query are translated into a form suitable for use by the reader 78 and are sent to the reader 78 for display.

An order is placed when the user interacts with the page elements associated with a product to order the product. An order form is displayed, pre-filled in with the user's relevant information necessary to complete the transaction and as requested by the retailer according to the privacy policy of the retailer. The user makes any necessary changes and additions to the order and places the order.

In at least one embodiment, if the reader 78 is online, the order is sent immediately. In at least one embodiment, if the reader 78 is offline, the order is sent the next time a connection to the system 50, the Internet, or another computer network is established.

When the commerce service 61 receives the order, an "order pending" confirmation is returned to the reader 78, along with an order identifier. The commerce service 61 translates the order into the format appropriate for the selected retailer and sends the order to the appropriate catalog order system 79, 79' and waits for confirmation of the order. When the order is confirmed, an "order confirmed" message is sent to the reader 78. If the catalog order system 79, 79' rejects the order, the reason for the rejection is returned to the reader 78 for display to the user.

After the order is placed, it can be canceled by bringing up the order status screen in the reader 78 and selecting the cancel option. The reader 78, in at least one embodiment, needs to be connected to the system 50 and/or online in order to confirm the cancellation; therefore the cancel option will not be available if the user is offline.

While the order is active (not received by the user), the system 50 monitors the status of the order via the commerce transaction interface. In at least one embodiment, the retailer notifies the commerce service 61 whenever the status of an order changes. If not, the commerce service 61 generates queries to the catalog order system 79, 79'. In at least one embodiment, the statuses of the various orders are displayed on the order status screen in the reader 78 and are updated whenever the reader 78 connects to the system 50.

Other features that the commerce service 61 can include, in some embodiments of the invention, include features such as affinity program management.

In at least one embodiment, the reader 78 allows the user to create multiple gift lists that can contain entries from different catalogs. In an embodiment, gift lists are created locally and synchronized with the user database 66 to allow the user to access the lists from any computer.

In at least one embodiment, the reporting service 75 also can provide reports relating to the commerce service 61. For example, the transactions that have been handled by the commerce service 61 can be aggregated and correlated with the demographic information in the user databases 66 to create transactions summaries for the retailers. Some examples might be the "most popular" product with consumers accessing the system 50 who are between the ages of 30 and 40, or the average order amount from a particular catalog.

In at least one embodiment, the commerce service 61 provides transaction histories and summaries for users. For example, if the user is connected to the system 50, the user can access previous transactions to possibly re-order items, or publish gift lists transaction summaries are also available. Some example summaries might be all transactions using a particular credit card across all retailers, or all transactions with a particular retailer.

The above described features and functions are available when the user has successfully opened the file because the user's userID matched that associated with the file (step 1010 of FIG. 9). At least a portion of these features and functions are available to users who have pass-along access, as well. The process for opening and reading a file detects whether the file is to be opened under pass-along conditions.

Referring again to FIG. 9, if the userID is not a match (step 1010), then the user is notified (step 1090) that the user needs pass-along rights to read the publication. To obtain pass-along rights, the user connects to the system 50 (such as via a designated web site on the Internet) (step 1100), provides required information to the system 50 (1110), such as original user's userID, the issue identifier and the new user's userID, and the like, to the pass-along service 68 (step 1110). If pass along is not allowed for the document (step 1120), the user is notified (step 1130). Pass along may be disallowed for many different reasons, such as time limits being exceeded, incorrect user, publisher restrictions, and the like.

If pass-along is allowed (step 1120), the key associated with the original user's download is retrieved and encrypted with the new user's userID for transmission to the new user (steps 1140, 1150). The reader 78 will then have has the key to open the pass-along file and note files, if any.

Figure 10:
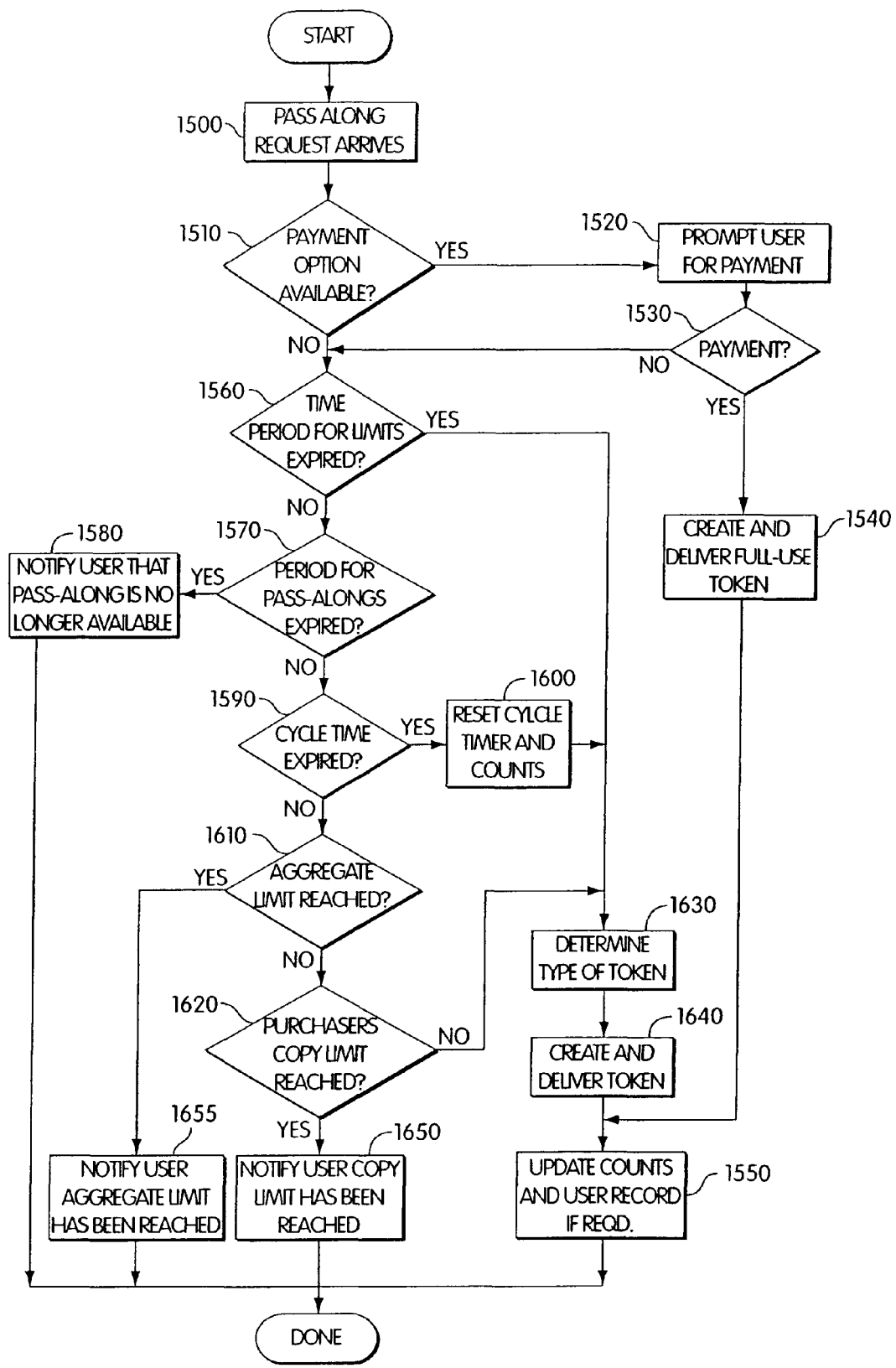
FIG. 10 is a flow chart illustrating a method for passing along a copy of an electronic document, in accordance with one embodiment of the invention.

If pass along is allowed for the document, in at least one embodiment of the invention, the pass-along process of FIG. 10 (described below) is followed to give the user access. At least one output of the process of FIG. 10 is providing the user who has requested access with an appropriate token to access the document (step 1150). When this token is provided, accessing the document proceeds as described previously for the non-pass-along user.

Whether and how a document can be passed along can be determined at different times. For example, in one embodiment, at the time a publisher provides a document to the system 50, the publisher may specify pass-along limits and/or requirements. In one embodiment, pass-along requirements are determined or set at the time that the original user purchases and/or received the magazine. Those skilled in the art recognize that many different conditions can be used to determine whether or not pass-along access to a document is granted, and under what terms. For example, many types of conditions that presently are used in systems that give users "read only" and/or limited access to documents, such as document management systems such as IMANAGE and PCDOCS, can be similarly applied for pass-along in accordance with the principles of the invention.

In one embodiment of the invention, pass-along is handled by having the purchaser of content deal with the delivery of the ZNO file (and, optionally, any associated annotation file) to the user.

In at least one embodiment of the invention, there are two types of pass-along tokens, the limited use token and the full-use token. The limited use token allows the user to view the contents of the pass-along file along with any notes, but not to make changes to the files. Additionally, the file is not registered in the user's archive. The full use token allows the user to treat the file as if the user had purchased it. It also becomes part of the users' archive so that all annotations, old and new, can be saved for later retrieval. With a full use token, should the original pass-along file and/or token be lost/deleted, the issue can be retrieved from the archive, but this time with the user's userID embedded in the file instead of the original purchaser's userID.

Besides handling the key management for pass-along, the pass-along service 68 also tracks the number of times a particular magazine issue has been passed-along in aggregate in the circulation database 64.

In at least one embodiment, the publisher sets at least some of the limits for the pass-along process for particular magazines. This data is kept in the pass-along database. For example, in one embodiment, the aspects of pass along that are controlled on a per issue basis are:

Number of times a purchaser's copy can be passed along.
Number of times in aggregate, an issue can be passed along.
Cycle time over which the number limits apply.
Termination of pass-along after a time period.
Termination of pass-along limit after a time period.
Free Pass along type.
Payment amount for pass-along The user database 66 includes, as part of the purchaser's record, a count of pass-along for a purchaser's copy.

FIG. 10 is a flow chart illustrating a method for passing along a copy of an electronic document, in accordance with one embodiment of the invention. When a pass-along request is received (step 1500) and there is a purchaser's copy limit (as specified in the pass-along database) (step 1620), the pass-along service 68 compares the limit to the count stored in the user database 66. If the limit has been reached, a message will be returned to the pass-along requester (step 1650) indicating the reason for not granting pass-along access. If the limit has not been reached, the appropriate type of pass-along token is generated (steps 1630 and 1640) and the count updated in the purchaser's record, the aggregate count in the circulation database 64, and the cycle count in the pass-along database 70 (step 1550). A value of 0 for the limit in the pass-along database 70 means that pass-along copies are not tracked by the purchaser's copy. In at least one embodiment, the system 50 also includes a maximum number of copies, stored in bytes, such as 256 bytes.

The circulation database 64 maintains a pass-along aggregate count, but, in at least one embodiment, for the purposes of enforcing a limit, the pass-along database 70 maintains the limit counter. When a pass-along request is received (step 1500) and there is an aggregate count limit (as specified in the pass-along database 70) (step 1610), the pass-along service 68 compares the limit to the cycle count value in the pass-along database 70. If the limit has been reached, a message will be returned to the pass-along requestor indicating the reason for not granting pass-along access (step 1655). If the limit has not been reached (and other appropriate conditions are met, as shown in FIG. 10), then the appropriate type of pass-along token is generated (steps 1630 and 1640), the aggregate count is updated in the circulation database 64, and the cycle count is updated in the pass-along database 70 (step 1550). A value of 0, for example, indicates that no pass-along copies are allowed. In some embodiments of the invention, there is a maximum value, which can be extremely high (on the order of millions of copies).

Cycle time for count limits is, in an embodiment of the invention, the feature that supports the following functionality:

Only 2 pass-along copies allowed per week from this purchased copy. (cycle time is one week.)
Only 2,000 aggregate pass-along copies per day. (cycle time is one day).

The cycle time value, cycle count value and the expiration time are maintained in the pass-along database 70. The cycle time is expressed in minutes while the expiration time, which includes the date, is maintained down to the minute. When a pass-along request is received (step 1500) and there is a cycle time limit, the pass-along service will compare the expiration time to the current time (step 1590). If the current time is beyond the expiration time, the expiration time is updated by adding the cycle time to the current time and storing the result as the new expiration time. The cycle count in the pass-along database 70 and the pass-along counter in the user database 66 are cleared (step 1600) while the aggregate count in the circulation database 64 is left alone. Pass-along processing then continues (steps 1630, 1640, and 1550) as if the timer had not expired.

If the current time is before the expiration time, the pass-along service 68 compares the relevant count values to decide if a pass-along token should be generated. A value of 0 indicates that cycle time is not active. In at least one embodiment, the maximum value is set to a predetermined number of days. In one embodiment, there are separate cycle timers for each count. In one embodiment, if cycle times are not used, the cycle count counter in the pass along database 70 is deleted.

The pass-along enable time is stored in the pass-along database 70 as a specific time/date value. For example, this value can be entered at the time the magazine issue was loaded into the data store. When a pass-along request is received (step 1500), the pass-along enable time is compared to the current time, (step 1570) if the current time is beyond the enable time, pass-along processing is stopped and a message returned to the user noting that the pass-along period has expired (step 1580). If the time has not expired, pass-along checking continues. A value of 0 indicates that pass-along is always enabled.

The pass-along limit enable time is stored in the pass-along database 70 as a specific time/date value. For example, this value can be entered at the time the magazine issue was loaded into the data store. When a pass-along request is received (step 1500), the pass-along limit enable time is compared to the current time (step 1560), if the current time is beyond the enable time, pass-along processing is stopped and a pass-along token is immediately generated without further checking (steps 1630, 1640, and 1550). If the time has not expired, pass along checking continues. A value of 0 indicates that pass-along limit checking is always enabled.

The Free pass-along Type for a particular issue is stored in the pass-along database 70. One type is the free pass-along, where a fee is not required and the issue can be passed along to anybody. In one embodiment, the free pass-along type can either be limited functionality, or full functionality.

In one embodiment, in conjunction with the pass-along price, three types of systems can be supported by the pass-along service 68:

pass-along files with limited functionality only. (Type=Ltd, Price=0)
pass-along files with full functionality only. (Type=Full, Price=0)
pass-along files with limited functionality unless purchased, in which case files are full function files. (Type=Ltd, Price=xxx cents)

The pass-along price is stored in the pass-along database 70 as a monetary value, for example in cents. The pass-along price is entered at the time the magazine issue is loaded into the data store. When a pass-along request is received (step 1500) and the pass-along price is not 0, a payment transaction is initiated by the pass-along service to allow the user to pay for the pass-along token (steps 1510 and 1520). If payment is received (step 1530), a full use pass-along token is generated (step 1540). If payment is not received, pass-along processing continues to see if a limited use token should be generated. A value of 0 indicates no need for payment, so the payment transaction is skipped and pass-along processing continues. In at least one embodiment, the pass along price has a predetermined maximum value.

Because pass-along files were not purchased, in at least one embodiment, certain limits are placed on their functionality. For example, pass-along files (unless paid for) are not recorded in the user's database 66, so they will not appear as part of the user's archive. Because pass-along files are not archiveable, any annotations made will not be stored on the archive server. If the file were to be deleted from the My Collections area, any notes would be lost.

One of the benefits of some embodiments of the invention is that, in these embodiments, usage data is generated that allows the readers to easily and (in at least one embodiment) anonymously tell the publisher what parts of magazine are of interest to the readership. This is accomplished by tracking the usage of the magazine.

Usage data is generated as the user is reading or browsing the document. Magazine usage is tracked by time stamping and recording file opens/closures, page turns, and link activations when the magazine is read. By comparing the time stamps, the duration of exposure can be determined as well as the page that was exposed magazine content information is not recorded as part of the log except for the issue identifier when a file is opened.

As the flowchart of FIG. 7 indicated, when the user enters the newsstand area of the reader 78, one action that occurs before the user is able begins using the newsstand functionality is to check whether the reader 78 requires updates. Another action that occurs before the user begins using the newsstand functionality or while the user uses the newsstand functionality on the reader 78 is that the reader 78 provides the magazine usage data to the system. After the usage logs are aggregated and filtered in the magazine usage database 72 by the magazine usage service 74, the publisher can, if desired, correlate the data to the known contents of the magazine to determine the items of interest to the issue's readership.

As shown in FIG. 8, when the reader 78 is opened for the first time as part of the initialization, a usage file is created to log the usage data. In one embodiment of the invention, the start of the log includes a header containing the local time at the device running the reader (e.g., local personal computer time), UCT time as reported by the system 50, and the log format version number. As the user reads the magazine, various events are recorded in the log along with the supporting information relevant for that event.

When the user connects to the system 50 to access the newsstand, or to acquire pass-along rights, or to download a magazine as part of a subscription, the magazine usage data collected to date on the user's reader 78 is sent back to the magazine usage service 74 and stored in the magazine usage database 72. These are the only occasions, in at least one embodiment of the invention, when usage data is sent back to the magazine usage database 72.

Prior to the file transfer, the current log file on the reader 78 is closed, and a new log file is opened. Should the transfer fail for some reason, the old log file is transferred at the next opportunity along with the new log file, which would be closed at that time. It is possible, in at least one embodiment, that there may be multiple old log files waiting to be transferred, but at some point, the file transfers will be successful and the local copies deleted.

Examples of events that are recorded, in accordance with an embodiment of the invention, include:
- Application open
- File open
- File close
- Page turns
- Link activations
- Screen saver entry
- System sleep
- Window minimize
- Window restore/maximize Those skilled in the art recognize, of course, that other types of events can be recorded and are within the scope of the invention. Each event saves Information such as that shown in Table 4:

TABLE 4

| Event | data |
|---|---|
| Application Open | Local Timestamp, EventID, index number in local users table of user that is logged in. |
| File Open | Local Timestamp, EventID, IssueID |
| File Close | Local Timestamp, EventID, IssueID |
| Page Turn | Local Timestamp, EventID, Page number(s) of new pages |
| Link activation | Local Timestamp, EventID, Link that was activated, Page number(s) of new pages if any. |
| Screen saver entry | Local Timestamp, EventID |
| System sleep | Local Timestamp, EventID |
| Window minimize | Local Timestamp, EventID |
| Window restore/maximize | Local Timestamp, EventID |

In one embodiment, the events are encoded in the log to minimize the size of the file for transport reasons and to limit the ability of the user to modify the log.

A single log is used for all instances and through the use of the user table index number to note when the user changes, so that the readership number for that issue can be estimated. The index number does indicate when a new user is reading the same magazine, but because the local user table is not sent to the usage service and the log file is not identified with a particular machine, the index number cannot be traced back to a particular user.

To detect tampering, in at least one embodiment the modification date and the size of the log file is recorded each time the reader 78 is closed. When the reader is opened and the file properties do not match, a new log is created and the old one is marked for transfer to a holding area in the magazine usage service for review. To address privacy concerns and/or user concerns about being recorded, in at least one embodiment of the invention, personally identifiable information is never recorded as part of the magazine usage data and/or a log file viewer will be provided to allow the user to look at the log.

Back at the system 50, the usage logs are filtered into the various tables representing each issue so that the data can be analyzed. In at least on embodiment, data analyses and reports are generated in the reporting service 75 and are provided to entities requesting the information, such as publisher business management 55 and publishing industry groups 57.

Data gathered in accordance with an embodiment of the invention, by tracking things such as magazine usage, can be used in a variety of ways. For example, by calculating the difference between time stamps, the amount of time a page is displayed can be calculated. By counting the number of times a particular page was displayed, accurate page "views" can be provided to entities such as advertisers. Reports relating to these and other topics can be generated according to what the publishers and industry groups desire. In one embodiment, if no user identifiable information is included with the magazine usage data, correlation with demographic information is not possible. In another embodiment, however, demographic information can be included at the reader 78 so that access to the user database 66 is not required. In one embodiment, magazine usage information includes the user identifier and references the user database 66 for demographic information.

Another feature available in some embodiments of the invention are reports such as audited circulation reports. Some statistics show that most magazine publishers' primary source of revenue is advertising. To support the advertising rates, publishers can show that readers are being exposed to the ads. Auditing reports based on data collected according to the current magazine auditing rules and regulations can be used as evidence of ad exposure. To be considered as circulation, magazines must be ordered, paid or qualified for, and delivered to the user. From the magazine usage data collected, a variety of reports are possible, especially if the data is correlated with information regarding the content of the pages. The data to be reported and the form of the reports depend on publisher and/or Industry requirements. As the description herein shows, however, at least one embodiment of the present invention advantageously can be used to provide data relating to these concerns more accurately, quickly, and inexpensively than known systems.

At least some embodiments of the invention generate circulation reports as necessary and in substantially the same format as the reports currently used for print distribution. The data from the reports can, for example, be exported for integration into the fulfillment systems that are currently supplying the circulation/readership information to the publishers. Using the usage logs, magazine readership could be estimated fairly closely.

Although the distribution system in some embodiments does not generate bills to the publishers, it provides input into billing system which, although not shown in FIG. 2, is part of some embodiments of the invention. Depending on the contract terms, the billing system can take data such as number of downloads per issue and number of pass-alongs per issue in the billing period and generate bills to the publishers. The data to be reported and the form of the reports depend on the contractual requirements.

In accordance with an embodiment of the invention, there are two places where archives of documents that have been acquired are maintained for the user, the local archive (on the device running the reader 78 and/or accessible to the reader 78, such as a disk) and the online archive accessible to the system 50.

The offline archive is also referred to herein in one embodiment, as the "My Collection" feature of the reader 78. In one embodiment, the offline archive is an alternate view of the operating system's file system on the device running the reader 78 (e.g., on the local driven or removable drive of the personal computer), starting at a particular node in the file system (referred to, by way of example only, as the Zinio root). The user can organize the files in any manner the user sees fit using the file system of the operating system. This includes putting all of the files in a single folder, subject to the limitations of the operating system.

Once the reader 78 receives a magazine file (e.g., a ZNO file), the reader adds the file to the offline archive when one of the following occurs, The file is placed under the Zinio root in the file system and the reader 78 is started.

The file is opened directly (double-click).

The file is opened via the file open dialog of the reader 78.

The file icon is dragged and dropped into the offline archive area.

Before adding the file to the offline archive, the reader 78 checks to be sure that the user has the right to access the file.

The last three events listed above are only relevant, in one embodiment, for files that are located outside of the reader 78's tree. When those events occur, a link is created in the appropriate location on the reader 78's tree to point to the file. The link can be moved and reorganized like a magazine file. No link is created if the user does not have the right to access the file.

Because the offline archive is an alternate view of operating system's file structure, any changes like adding or deleting folders and files outside of the reader 78 are reflected in the display of the offline archive contents. Similarly, any changes made in the reader 78 to the offline archive area also are reflected in the file system.

The offline archive/My Collection display is determined when the reader 78 switches to the "My Collection" mode (see, e.g., the My Collection feature 2000 of FIG. 14). The reader 78 scans the folder to be displayed in the My Collection window for files that can be accessed by the user currently logged in. This is accomplished, for example, by scanning the headers of the ZNO files, which include the cover thumbnail images. Files not accessible to the user are not displayed. In one embodiment, if scanning a folder takes too long, an index file can be used instead. The index is updated periodically to keep up with changes that occur outside of the reader 78.

Besides magazine and catalog ZNO files, the offline archive, in at least one embodiment, can hold ZNO related files. The ZNO related files are stored in special file folders at the Zinio root and do not show up as part of the documents displayed in the offline archive area. These files include, for example, the annotation files (ZNT), the key tokens for opening ZNO files (ZTK), and the usage logs (ZMU).

On systems that support multiple users, each user has a folder at the Zinio root that will serve as their personal root for the offline archive area. This allows each user to create her own organizational structure under her personal root. To share documents, the user can, for example, use the file open dialog to go to the other users' folder and link in documents. If the first user does not have access to the file contents, the link will not be created.

In accordance with an embodiment of the invention, the online archive comes in two varieties, a basic purchased-issues index and an enhanced services archive. The basic purchased-issues index allows the user to recover, old magazine files should the user delete them from her local archive. The enhanced services archive allows the user to save annotations, organization schemes, and clippings she may have made to the local versions of her archive. This also allows the user to use different machines to access her personalized copies of the magazines.

The purchased-issues index is, in at least one embodiment, a list of the magazine issues that have been purchased by the user and is intended for use by the user as a way to recover files deleted from the user's local archive. The purchased-issues index is accessed via the "Archive" area of the newsstand on the reader 78. The user may sort the list in a limited number of ways; for example, by title, date of purchase, or date of publication in ascending or descending order. In at least one embodiment, the list includes a display of thumbnail image covers of magazines, to help the user more easily locate the desired issue.

In at least one embodiment of the invention, when the user wants to recover a magazine file, he goes online, to the system 50 and enters the archive area of the newsstand on the reader 78. The magazine encryption and distribution service 60 displays the list of magazines that the user has purchased or for which the user is "qualified" or "approved" to access. The user then selects a magazine from the list and confirms the download of the file, the key token or both to a location in the local archive specified by the user (see, e.g., the screen shot of FIG. 12). In at least one embodiment, the separation of the key file and ZNO file allows the case of corrupted keys to be quickly remedied, letting the user back into his magazine. Because the same IssueID will be used, any annotation files that have been created re-associate with the restored magazine file.

In at least one embodiment of the invention, the system 50 includes an enhanced services archive that extends the offline archive into the online archive by attempting to mirror the user's offline archive organizational structure and interface.

Each issue that the user has access to is represented by a cover thumbnail and located in the appropriate category folder in the archive area of the newsstand. Any clippings in the category folders are also mirrored in the online archive. Any annotations for a particular issue are also archived.

By having the online archive be a superset of the offline archive, the user can log onto any machine and restore a selected subset of magazines and clippings along with any annotations he may have been added. In one embodiment, to simplify potential difficulties with keeping the online archive up to date, the user sets parameters that automatically synchronize at a given event, like opening the reader 78, when a connection was available, or scheduled time, like every Sunday evening.

In one embodiment, to restore/get an archived issue or group of files, the user goes online to the system 50 and enters the archive area of the newsstand. There, the magazine encryption and distribution service 60 displays the issues using cover thumbnails and organized in the same manner as the user's My Collection area. The user selects a file or folder by clicking on the cover/folder icon and confirming the download, with or without annotations. The reader places the file(s) in the proper categories in the offline archive area.

In at least one embodiment, synchronization between archives can occur automatically or manually. Manual synchronization is initiated when the manual synchronization button located in the archive area of the newsstand is activated. When synchronizing, any article clippings and annotation files that have been modified since the last synchronization will be copied to the online archive. Files are not deleted during the synchronization process. Any changes to the organizational structure of the offline archive are also updated.

Figure 18:
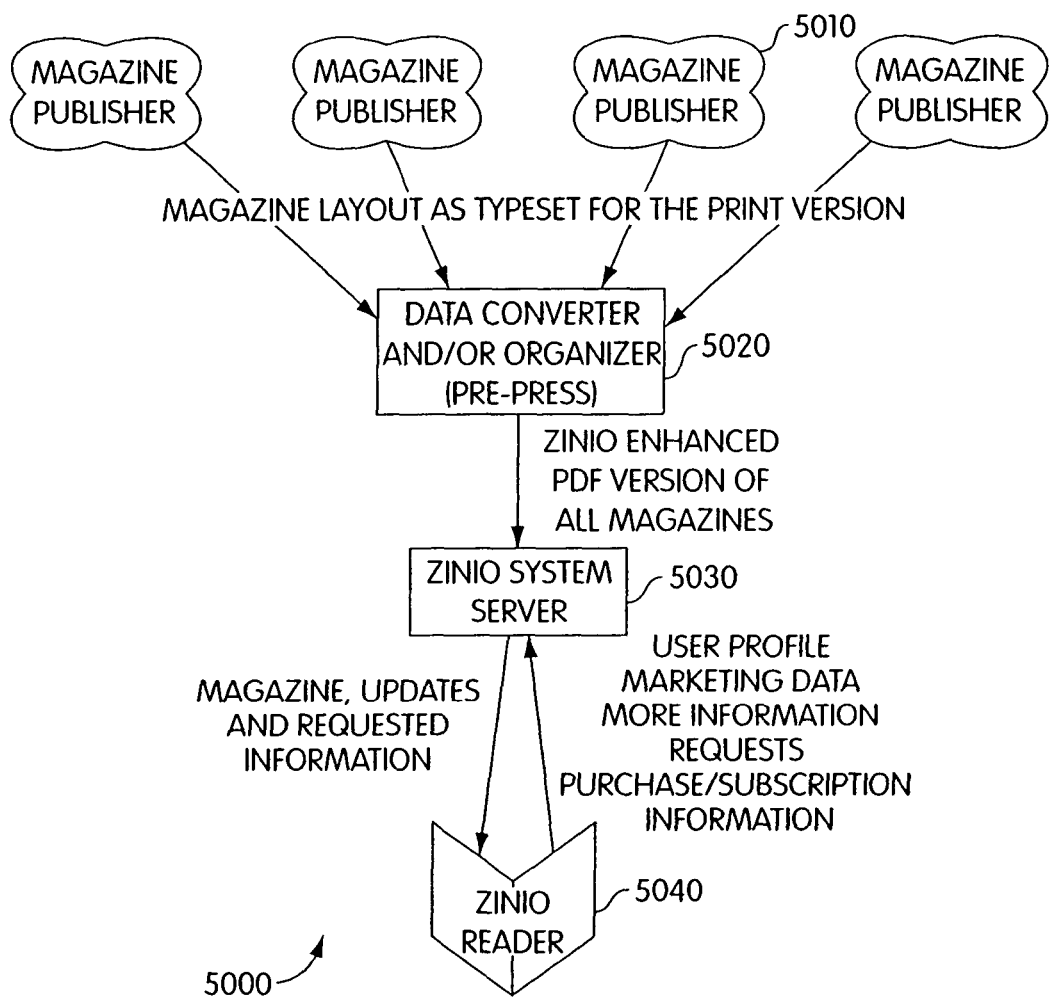
FIG. 18 is a diagram of an electronic magazine system implemented in accordance with an embodiment of the invention.

In another aspect, the invention provides an electronic magazine reading device and another embodiment of a system for reading the content described herein. FIG. 18 is a diagram of an electronic magazine system implemented 5000 in accordance with an embodiment of this aspect of the invention. The electronic magazine system 5000 of FIG. 18 includes a data converter module 5020, a data server 5030, and a reading device 5040, and interacts with at least one publisher 5010.

In FIG. 18, the data server 5030 is a "central" repository of all magazines that allows the user to retrieve updates or replacement for damaged media. In addition, the data server 5030 can provide features, like article "page rip-out," a feature that permits users to get a copy of the article that looks exactly like the article looked when it appeared in the publication (as if the user had been able to rip it out of an actual magazine). The data server 5030 allocates a portion of storage space for each respective reader device 5040 to which it sends information. In addition, the data server 5030 stores an exact copy of each publication that has been ordered by and/or sent to one of the reader devices 5040.

When the data server 5030 receives a request from a reader device 5040 for a "rip out" of an article page, the data server 5030 transmits to the allocated storage space the portion of the stored publication corresponding to the stored page(s). The user can then use the reader device 5040 to communicate with the data server 5030 to tell it what should be done with the "ripped out" page(s). For example, the page(s) could be sent to another user, such by electronically mailing it directly to the user, posted to a particular WWW site, printed, added to a library of stored articles, and the like.

The reader device 5040 of FIG. 18 is a device capable of reading the electronic magazine, such as a computer or a wireless reader device. In the illustrated embodiment, the reader device 5040 is the only interface with the content and data server 5030. The reader device 5040, in at least one embodiment, comprises an electronic device for displaying magazine content having two opposing surfaces joined by a hinge, such that the reader can look at two opposing "pages" in a manner similar to reading a magazine. The opposing surfaces, in other embodiments, are connected by other means capable of creating a "magazine-like" feel, such as a spiral edge, flexible brackets, and the like. To keep the reader device 5040 as small and "magazine like" as possible, the reader device 5040 is light in weight, less than an inch thick, and has approximately a twelve-inch diagonal screen size, so as to closely replicate an actual magazine in size. This reader device 5040 is structured and arranged such that the reading experience feels the same as printed magazine, with exactly the same text and graphics appearing on the screen as appear in printed magazines.

In at least one embodiment of the invention, the reader device 5040 provides the following functionality.

Provides user interaction with enhanced magazine that it displays.
Provides user interaction with the data server 5030.
Stores electronic magazines and user profile/preferences
Converts magazine data from stored format to display format
Communicates with data server 5030 as required
Monitors user preferences and requests
Manages power to the device (i.e., can tell the user the status of the battery)

In addition, as described more fully herein, the electronic magazine system 5000 of an embodiment of the invention includes interactive features to enhance the experience of the user, is capable of downloading information using various techniques, including wireless and/or cellular techniques, and is capable of storing up to one thousand pages (approximately five magazines). The electronic magazine system of this embodiment is, for example, suitable for travelers (both business and general), is capable of being used under many different lighting conditions, and is small enough to be stored in a briefcase.

Given the bandwidth constraints in delivering the magazine content directly to the reader device 5040 from the data server 5030, at least one embodiment of the invention seeks to minimize the size of the size of the magazine file. In one embodiment, the PDF data format is used because of the smaller data files that that result and the superior text legibility. In some embodiments of the invention, however, other data transfer formats, such as JPEG/HTML with no zoom level or with two zoom levels, are usable.

As explained above, the data converter 5020 converts the magazine content into PDF files.

In another aspect, the electronic magazine system 5000 of this embodiment of the invention goes beyond the available ROCKET EBOOK and EVERYBOOK products by providing users with the ability to interact with at least a portion of the content appearing in the electronic periodical being viewed. As explained previously, the electronic magazine 110 system 5000 of this aspect provides a back-end infrastructure whereby at least a portion of the content in the periodical and transactions associated with the electronic magazine are routed through a centralized data server 5030. This routing also permits the user to seamlessly order products and/or services appearing in the magazine (whether appearing in advertisements or features).

In one embodiment, this is accomplished by the user's double touching (e.g., double clicking) the product or service of interest, which cause a information relating to the product or service for sale to appear on the screen of the wireless reading device (e.g., via a pop-up screen). The user selects what he or she wishes to order and touches the screen to at preselected locations on the image (e.g., an "order" button) to submit the order. Then, the reader device 5040 sends the information to the data server 5030. The data server 5030 receives the order from the user and sends the information to the seller (not shown in FIG. 18) so that the seller can fulfill the order. In one embodiment, the data server 5030 receives the order from the user and stores the order information so that it can later be transmitted to the seller.

In another embodiment, the data server 5030 monitors information relating to orders placed using the reader device 5040 (e.g., what seller the order corresponds to, what magazine the advertisement appeared in, how many orders resulted from particular advertisements, etc.) In that manner, the sellers and magazine publishers 5010 can learn how successful their advertisements are, enabling sellers to market more effectively and magazine publishers to more accurately price space in their magazines. This feature also enables the magazine publishers 5010 to tailor the advertisements placed in a magazine selectively for specific subscribers, while still maintaining the rest of the magazine content exactly the same as the printed publication counterpart.

For example, in one embodiment, the data server 5030 tracks the ordering habits of subscribers to learn that a particular group of subscribers orders a lot of clothing from the magazines that they read but never orders cosmetics. The magazine publisher 5010, when provided with this information, provides to the data converter 5020 a "version" of the magazine for this particular group of subscribers, wherein the "version" of the magazine contains ads tailored to the buying habits of that group of subscribers. For example, instead of a full-page cosmetics advertisement that regularly appears on page 5 of the magazine, the publisher might instead substitute a different advertisement relating to clothing.

The above-described process can also work in the reverse. Because the reader device 5040 is capable of transmitting information such as user profiles to the data server 5030 (along with marketing data, requests for information, requests to purchase and/or subscribe to magazines, etc.), a user can also tell the publisher directly the type of information in which the user is interested. For example, when ordering a subscription to a magazine, the user can indicate specific areas of interest, the data server 5030 can track and organize this information, and the information can be provided to the magazine publishers 5010 so that at least a portion of the content (including, but not limited to, advertisements) can be adjusted accordingly.

The interaction described above is not limited, of course, to commerce transactions. In one embodiment, the system 5000 permits the user to touch a portion of a displayed page to get more information about a particular topic that is displayed there, or to get information relating to related magazines and/or articles relating to the area touched. This additional information is stored at the data server 5030, can be organized at the data converter 5020 and is linked to as desired by the user of the reader device 5040.

The following provides a more detailed description of the reader device 5040, in accordance with one embodiment of the invention. The reader device 5040 is implemented using a platform such as the Intel x86/PC platform. However, because the reader device 5040 is dedicated to a single function, in this embodiment only a subset of the PC platform is provided. For example, in this embodiment, the printer port, disk drive, interfaces, audio, mouse, and keyboard functions are not implemented. However, it should be understood that, as technological improvements enable these functions to be implemented in more compact and/or lightweight ways, any one or more of these features can be added to the reader device 5040.

Figure 19:
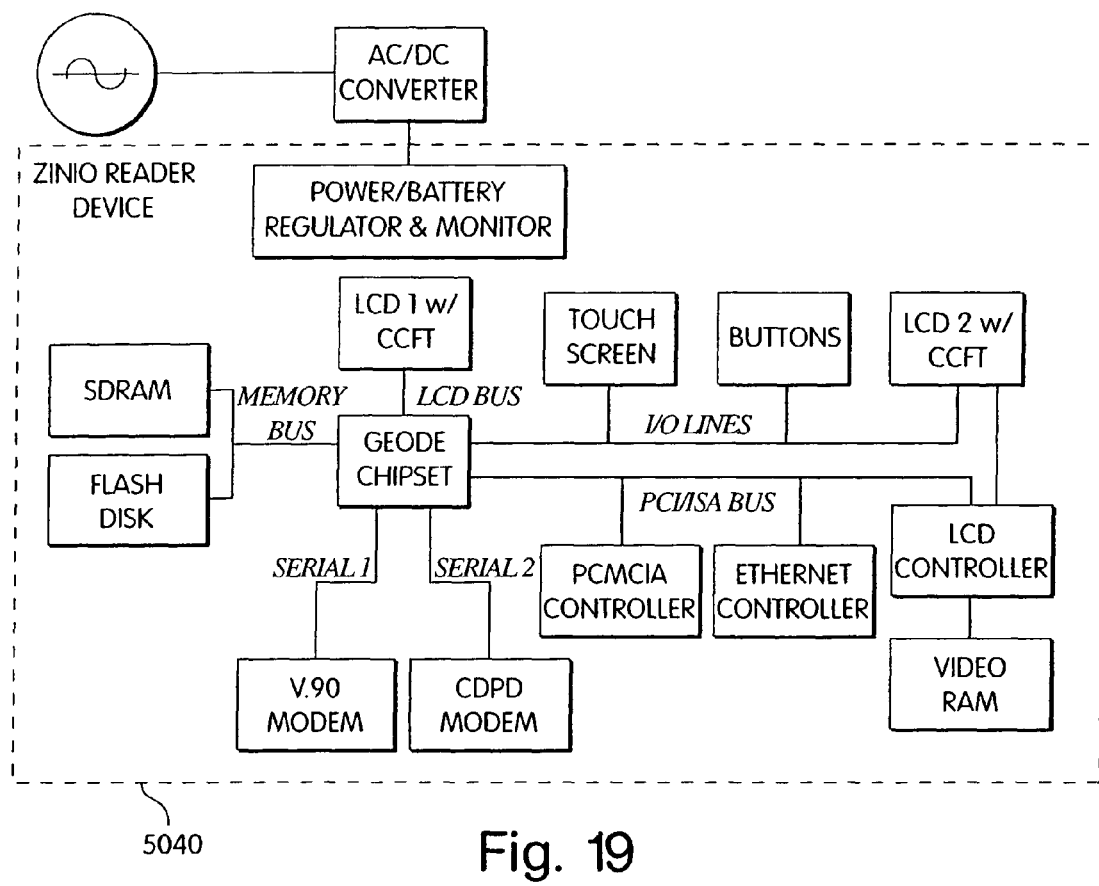
FIG. 19 a block diagram of a reader device, in accordance with one embodiment of the invention.

FIG. 19 a block diagram of a reader device 5040, in accordance with one embodiment of the invention. Note that, although the diagram shows the reader device 5040 coupled to an alternating current (AC) power source, the reader device 5040 can be run off its batteries without connecting to AC.

The display for the reader device 5040 comprises at least one LCD flat panel display, to meet the requirements for small physical volume and low power. However, the invention is usable with any type of lightweight, low power display. At present, the available displays that are feasible for a briefcase sized device support a resolution of 1024×768 pixels, commonly known as XGA. With these displays, this is the resolution and aspect ratio that bitmap graphics are optimized for during the PDF generation process. For the best possible viewing angle and color fidelity, this embodiment of the invention uses active-matrix displays with backlighting. In another embodiment, given the presence of the touch screens, backlighting is increased. As other types of technologies, such as plasma technologies, micro-mirrors, arrays of organic light emitting diodes (LED's), and the like become smaller and less power consuming, screens implemented in accordance with these technologies can be usable in accordance with the invention, as well.

The interfaces between the reader device 5040 and the data server 5030 comprise touch screens and/or ancillary buttons. In one embodiment of the invention, to ensure high resolution when touched by a finger, resistive touch screen technology is used. However, those skilled in the art will recognize that other types of touch screen technology, such as capacitive, near-field imaging, scanning infrared (IR), surface acoustic wave (SAW) and/or strain gauges can be used.

In one embodiment, the buttons perform functions related more to the reader device 5040 itself than to the screens, so the buttons are used less often than the touch screen. The buttons can be discrete mechanical switches or membrane style switches, either snap-dome or conductive rubber. To keep the reader device 5040 as thin and as low-cost as possible, the buttons can be made of conductive rubber.

The PDF data memory can be any type of memory having a good balance between low profile, low cost, and best capacity. For example, in one embodiment, the PDF data memory can be any of the following types of memory: MiniDisc data; Click; Superdisk; 80 mm CD-ROM; Iomega Zip; ATOMlite; IBM Microdrive; MemoryStick; CompactFlash I, Compact-Flash II, or ATA flash. Other types and styles of data memory are usable in accordance with the invention.

The batteries can be any type of battery having a good balance between charge density versus weight and volume. For example, the batteries can be any of the following types: Lithium Polymer, Lithium-ion, or Nickel Metal Hydride.

The processor can be any type of processor having a good balance between low power, board space, cost, and Intel x86 compatibility, such as National Semiconductor's Geode family and the Crusoe family. Other possibilities for the processor include the Intel North & South Bridge or the Asilian Technologies LCD Controller.

The case for the reader device 5040 can be manufactured using any process known to those skilled in the art, such as Thixmolding, injection molding, sheetmetal processing, die casting, and the like.

Figure 20:
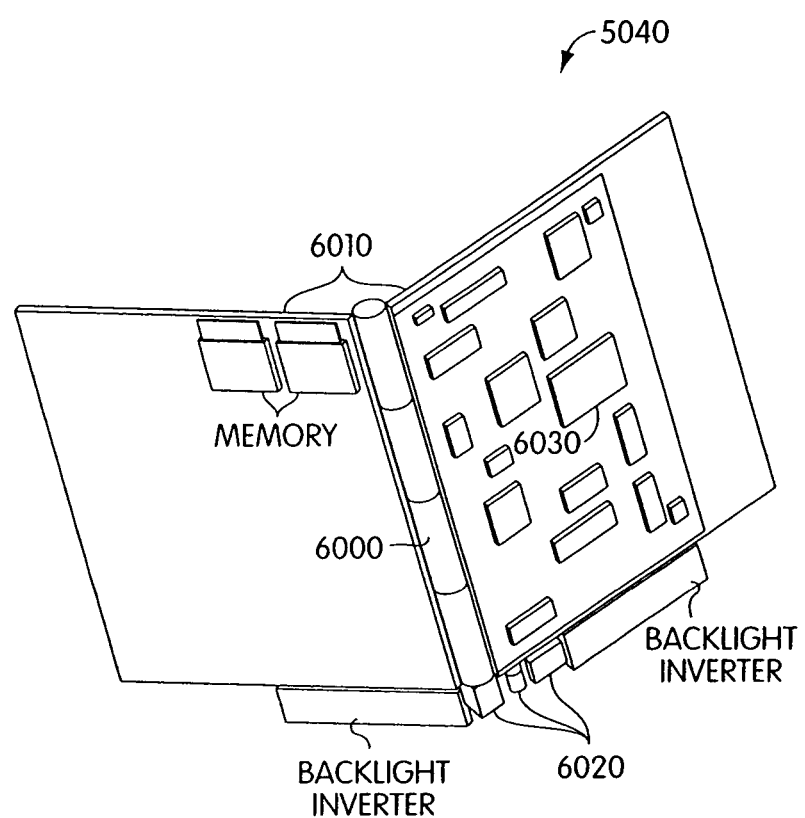
FIG. 20 is a visual representation of a reader device implemented in accordance with one embodiment of the invention.

FIG. 20 is a visual representation of a reader device 5040 implemented in accordance with one embodiment of the invention. In FIG. 20, the internal components of the reader device 5040 are visible for illustrative purposes only. As this figure illustrates, the batteries 6000 are disposed in an array 20 along the "hinge" or "spine" portion of the reader device 5040. A pair of liquid crystal display (LCD) screens 6010 is oriented on either side of the battery array 6010. On the other end of the battery array 6010 is a power socket 6020. Each of the LCD screens 6010, in one embodiment, is backlit. The reader device 5040 of this embodiment also includes a modem 6030, which can be a conventional telephonic modem, a cable modem, a cellular modem, and the like.

Figure 21:
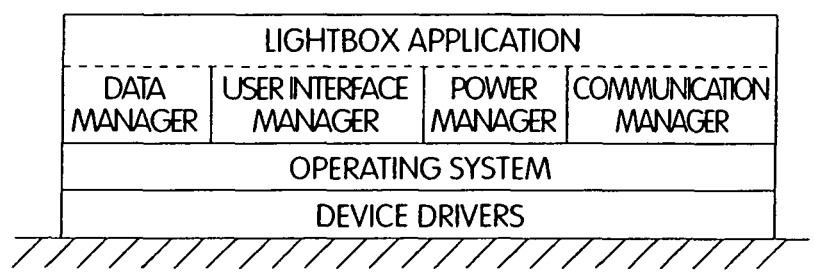
FIG. 21 is a block diagram of the organization of the software running on the reader device, in accordance with an embodiment of the invention.

FIG. 21 is a block diagram of the organization of the software running on the reader device 5040, in accordance with an embodiment of the invention. The following set of descriptions illustrates the organization and structure of the software running on the wireless reader device, in accordance with one embodiment of the invention.

Electronic magazine device Application—Proprietary software that executes the logic necessary to deliver the wireless reader device functions. At its core is the PDF Library licensed from Adobe.

data Manager—Proprietary software to manage storage and access of electronic magazine system data.

user Interface Manager—Proprietary software that implements the desired user interaction.

Power Manager—Proprietary software to manage power from the battery/charger.

Communication Manager—Proprietary software to transfer data between the wireless reader device and the data server 5030.

Operating System—Linux software to manage the wireless device reader device resources.

Device Drivers—COTS and proprietary software to interface with the wireless device reader hardware.

Although the reader device 5040 of at least one embodiment is a two-screen configuration, in another embodiment, the reader device 5040 also is implemented as a single screen configuration, such as a tablet.

A future application of at least one embodiment of the electronic magazine systems of the invention that are described herein may be in a new wireless LAN technology being developed called Bluetooth. This technology is targeted at smaller, personal networks. These networks typically operate at 1 Mbps and only cover about a 10 m radius area. The impact of Bluetooth will be in the constant connectivity of devices in a room. However, because the nodes are small and stationary, the impact on data transfers while the user is in transit will be minimal. While at a location, Bluetooth may be adequate for magazine updates. A competing standard with similar characteristics is also being developed called HomeRF.

For at least one embodiment of the electronic magazine system described herein, the wireless WAN improvements will have the greatest impact, with cellular likely to be the greatest contributor. A convergence between North American and global standards is expected. Japan is leading the way as a test bed for such 3G (third generation) technologies, which rely heavily on an evolving set of technologies called W-CDMA (wideband Code Division Multiple Access). By the year 2003, the data rate is expected to be about 2 Mbps.

As those skilled in the art will recognize, the invention described herein can be modified to accommodate and/or comply with any one or more of the above-described technologies and standards. In addition, variations, modifications, and other implementations of what is described herein can occur to those of ordinary skill in the art without departing from the spirit and the scope of the invention as claimed.

It should be understood that, in the Figures of this application, in some instances, a plurality of system elements or method steps may be shown as illustrative of a particular system element, and a single system element or method step may be shown as illustrative of a plurality of a particular systems elements or method steps. It should be understood that showing a plurality of a particular element or step is not intended to imply that a system or method implemented in accordance with the invention must comprise more than one of that element or step, nor is it intended by illustrating a single element or step that the invention is limited to embodiments having only a single one of that respective elements or steps. In addition, the total number of elements or steps shown for a particular system element or method is not intended to be limiting; those skilled in the art will recognize that the number of a particular system element or method steps can, in some instances, be selected to accommodate the particular user needs.

It also should be noted that the previous illustrations of screen shots, together with the accompanying descriptions, are provided by way of example only and are not limiting. Those skilled in the art will recognize that many different designs of interfaces, screen shots, navigation patterns, and the like, are within the spirit and scope of the invention.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention as hereinafter claimed.

The invention claimed is:

1. A system for distributing an electronic document comprising:
   a memory configured to store the electronic document; and
   a central distribution system in operable communication with the memory, the distribution system configured to:
      retrieve a copy of the electronic document from the memory;
      associate with the copy of the electronic document one or more rights, wherein each of said rights defines an action capable of being performed on at least a portion of the copy of the electronic document; and
      provide the copy of the electronic document in a form that allows a first client to exercise the one or more rights associated with the copy of the electronic document, wherein one of the rights associated with the copy of the electronic document includes the ability of the first client to share with a second client rights to at least a portion of a body of content of the electronic document to enable the second client to access the shared content based on rights derived from the first client through an act of said sharing even if the second client is not otherwise entitled to access the shared content, and wherein the central distribution system is configured such that said second client receives said at least a portion of said shared body of content from said central server only after the second client's rights to receive the shared content, as derived from the first client, are exercised by the second client such that the exercise of such rights by said second client directly causes the shared content to be delivered to the second client.

2. The system of claim 1 wherein one of the one or more rights defines the scope of the action capable of being performed.

3. The system of claim 1 wherein one of the one or more rights defines who is able to perform the action capable of being performed.

4. The system of claim 1 wherein one of the one or more rights defines at least one of: annotating, copying, printing, forwarding, editing, highlighting, tabbing, and storing the copy of the electronic document.

5. The system of claim 1 wherein the electronic document comprises content present in a printed document and at least one additional content not present in the printed document.

6. The system of claim 5 wherein the additional content comprises at least one element selected from the group consisting of audio information, video information, graphic information, and links to locations on a computer network.

7. The system of claim 1 wherein the distribution system is further configured to receive payment information associated with the first client.

8. The system of claim 1 wherein the distribution system is further configured to receive information associated with the usage by the first client of the provided copy.

9. The system of claim 1 wherein the distribution system is further configured to receive information associated with the usage by the second client of the shared content.

10. The system of claim 1 wherein the central distribution system is not primarily associated with either the first client or said second client.

11. The system of claim 1 wherein the central distribution system is configured to carry out the retrieving, associating and providing steps for a plurality of clients beyond the first and second clients, and wherein the central distribution system is configured to control access to and sharing of the electronic document or copies thereof by all of the plurality of clients of the system.

12. The system of claim 1 wherein the central distribution system remains centrally located and is not provided, incorporated, distributed or transmitted with the electronic document, its content, or any copy thereof.

13. The system of claim 1 wherein the first client and the second client lack the ability to control access to and sharing of the electronic document or copies thereof independent of the central distribution system.

14. The system of claim 1 wherein the central distribution system is configured to control further sharing of the electronic document or copies thereof by the second client.

15. The system of claim 1 wherein any sharing or attempting sharing of said body of content by said first client with said second client is either allowed or disallowed by said central distribution system.

16. The system of claim 1 wherein at least part of the content of said electronic document is simultaneously viewable by said first client and said second client on separate, respective display devices.

17. The system of claim 1 wherein said central distribution system is configured to provide said at least a portion of said body of content from said central server to said second client only if the first client has first authorized such provision.

18. The system of claim 1 wherein said central distribution system is configured to provide said at least a portion of said body of content from said central server to said second client only if the first client has first authorized such provision by delivering a token to said second client.

19. The system of claim 1 wherein said second client receives said at least a portion of said body of content from said central server and not from said first client.

20. The system of claim 1 wherein the central distribution system is configured such that said second client receives the entirety of said body of content from said central server after the second client's rights are exercised.

21. A method for distributing an electronic document comprising:
maintaining a memory configured to store the electronic document;
associating with a copy of the electronic document one or more rights, wherein each of said rights defines an action capable of being performed on at least a portion of the copy of the electronic document, wherein the associating step is performed by a central distribution system; and
providing the copy of the electronic document in a form that allows a first client to exercise the one or more rights associated with the copy of the electronic document, wherein one of the rights associated with the copy of the electronic document includes the ability of the first client to share with a second client rights to at least a portion of a body of content of the electronic document to enable the second client to access the shared content based on rights derived from the first client through an act of said sharing even if the second client is not otherwise entitled to access the shared content, and wherein said second client receives said at least a portion of said shared body of content from said central server only after the second client's rights to receive the shared content, as derived from the first client, are exercised by the second client such that the exercise of such rights by said second client directly causes the shared content to be delivered to the second client.

22. The method of claim 21 wherein one of the one or more rights defines the scope of the action capable of being performed.

23. The method of claim 21 wherein one of the one or more rights defines who is able to perform the action capable of being performed.

24. The method of claim 21 wherein one of the one or more rights defines at least one of: annotating, copying, printing, forwarding, editing, highlighting, tabbing, and storing the copy of the electronic document.

25. The method of claim 21 wherein the electronic document comprises content present in a printed document and at least one additional content not present in the printed document.

26. The method of claim 21 further comprising receiving payment information associated with the first client.

27. The method of claim 21 further comprising receiving information associated with the usage by the first client of the provided copy.

28. The method of claim 21 further comprising receiving information associated with the usage by the second client of the shared content.

29. A computer program product for distributing an electronic document, the computer program product being embodied in a non-transitory computer readable storage medium or memory device and comprising computer instructions for:
maintaining the electronic document in a memory;
associating with a copy of the electronic document one or more rights, wherein each of said rights defines an action capable of being performed on at least a portion of the copy of the electronic document; and
providing the copy of the electronic document in a form that allows a first client to exercise the one or more rights associated with the copy of the electronic document, wherein one of the rights associated with the copy of the electronic document includes the ability of the first client to share with a second client rights to at least a portion of a body of content of the electronic document to enable the second client to access the shared content based on rights derived from the first client through an act of said sharing even if the second client is not otherwise entitled to access the shared content, and wherein said second client receives said at least a portion of said shared body of content from said central server only after the second client's rights to receive the shared content, as derived from the first client, are exercised by said second client such that the exercise of such rights by said second client directly causes the shared content to be delivered to the second client.

30. The computer program product of claim 29 further comprising computer instructions for receiving information associated with the usage by the first client of the provided copy.

31. The computer program product of claim 29 further comprising computer instructions for receiving information associated with the usage by the second client of the shared content.

* * * * *